United States Patent
Han et al.

(10) Patent No.: US 11,474,683 B2
(45) Date of Patent: Oct. 18, 2022

(54) PORTABLE DEVICE AND SCREEN CONTROL METHOD OF PORTABLE DEVICE

(71) Applicant: SAMSUNG ELECTRONICS CO., LTD., Suwon-si (KR)

(72) Inventors: Min-Seok Han, Anyang (KR); Min-Jin Rho, Seoul (KR); Min-Shik Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/492,831

(22) PCT Filed: Mar. 9, 2018

(86) PCT No.: PCT/KR2018/002829
§ 371 (c)(1),
(2) Date: Sep. 10, 2019

(87) PCT Pub. No.: WO2018/164534
PCT Pub. Date: Sep. 13, 2018

(65) Prior Publication Data
US 2020/0150794 A1 May 14, 2020

(30) Foreign Application Priority Data
Mar. 10, 2017 (KR) .......................... 1020170030649

(51) Int. Cl.
*G06F 3/0488* (2022.01)
*G06F 3/044* (2006.01)

(52) U.S. Cl.
CPC ............ *G06F 3/0488* (2013.01); *G06F 3/044* (2013.01)

(58) Field of Classification Search
CPC ...... G06F 3/044; G06F 3/0488; G06F 3/0416; G06F 3/043
(Continued)

(56) References Cited

U.S. PATENT DOCUMENTS 7,463,260 B1 * 12/2008 Holmes .................. G06Q 40/12
382/113
2011/0067059 A1 * 3/2011 Johnston .................. G10L 15/30
725/39
(Continued)

FOREIGN PATENT DOCUMENTS

KR 10-2011-0033708 A 3/2011
KR 10-2014-0011881 A 1/2014
(Continued)

OTHER PUBLICATIONS

International Search Report (PCT/ISA/210) dated Jun. 15, 2018 issued by the International Searching Authority in International Application No. PCT/KR2018/002829.
(Continued)

*Primary Examiner* — Michael A Faragalla
*Assistant Examiner* — Sujit Shah
(74) *Attorney, Agent, or Firm* — Sughrue Mion, PLLC

(57) ABSTRACT

A portable device and a screen control method of the portable device are provided. More specifically, disclosed are: a portable device of which the screen is changed according to a text recognition result of a text selected in response to the continuous movement of a touch received in a text display area; and a screen control method of the portable device. Some of the disclosed embodiments provide: a portable device of which the screen is changed according to control information corresponding to a text recognition result of a text selected by the continuous
(Continued)

movement of a touch received in a text within a text display area; and a screen control method for the portable device.

17 Claims, 16 Drawing Sheets

(58) Field of Classification Search
USPC .................................................. 345/173–174
See application file for complete search history.

(56) References Cited

U.S. PATENT DOCUMENTS

| | | | | |
|---|---|---|---|---|
| 2012/0023411 | A1* | 1/2012 | Ryu | A43B 3/0005 |
| | | | | 715/740 |
| 2014/0198343 | A1* | 7/2014 | Cho | H04N 1/00482 |
| | | | | 358/1.15 |
| 2014/0253702 | A1* | 9/2014 | Wexler | G06K 9/00442 |
| | | | | 348/62 |
| 2014/0337790 | A1* | 11/2014 | Kim | G06F 3/04842 |
| | | | | 715/781 |
| 2014/0347296 | A1* | 11/2014 | Yoshikawa | G06F 3/0485 |
| | | | | 345/173 |
| 2015/0106085 | A1* | 4/2015 | Lindahl | G06F 3/167 |
| | | | | 704/231 |
| 2015/0127353 | A1* | 5/2015 | Cho | G06F 3/167 |
| | | | | 704/275 |
| 2015/0254518 | A1* | 9/2015 | Griffin | H04M 1/72552 |
| | | | | 382/229 |
| 2015/0324334 | A1 | 11/2015 | Lee et al. | |
| 2016/0179943 | A1 | 6/2016 | Ku et al. | |
| 2016/0266769 | A1* | 9/2016 | Oursbourn | G06K 9/00442 |
| 2017/0317983 | A1* | 11/2017 | Kompalli | G06F 21/6209 |
| 2017/0329428 | A1 | 11/2017 | Seong et al. | |
| 2018/0013876 | A1* | 1/2018 | Kim | G06F 3/04883 |
| 2018/0061409 | A1* | 3/2018 | Valentine | G10L 15/24 |

FOREIGN PATENT DOCUMENTS

| | | |
|---|---|---|
| KR | 10-2014-0037519 A | 3/2014 |
| KR | 10-2014-0133083 A | 11/2014 |
| KR | 10-2014-0133153 A | 11/2014 |
| KR | 10-2015-0128127 A | 11/2015 |
| KR | 10-2016-0051081 A | 5/2016 |
| KR | 10-2016-0074320 A | 6/2016 |

OTHER PUBLICATIONS

Written Opinion (PCT/ISA/237) dated Jun. 15, 2018 issued by the International Searching Authority in International Application No. PCT/KR2018/002829.

* cited by examiner

PORTABLE DEVICE AND SCREEN CONTROL METHOD OF PORTABLE DEVICE

CROSS-REFERENCE TO RELATED APPLICATION(S)

This application is a National Phase Entry of PCT International Application No. PCT/KR2018/002829, which was filed on Mar. 9, 2018, and claims priority to Korean Patent Application No. 10-2017-0030649, which was filed on Mar. 10, 2017, the contents of which are incorporated herein by reference.

FIELD

The disclosure generally relates to a portable device and a method of controlling a screen of a portable device, and more particularly to a portable device for changing a screen in response to continuous movement of a touch detected in a speech bubble displayed on the portable device and a method of controlling a screen of a portable device.

DESCRIPTION OF THE RELATED ART

With the development of technology, portable devices may provide not only call and data transmission functions but also multitasking and various services and functions through various applications.

The portable device receives user input by the press of a button (or key), a touch made through a touch panel (or a touch gesture), a voice input through a microphone, and motion detected by a sensor. The user input may be made once or a plurality of times in succession (or in the form of a combination of the aforementioned kinds of user input). The portable device may display a screen (for example, a setting screen) corresponding to the received user input or execute an application (for example, a camera application).

SUMMARY

A portable device and the control method of a portable device may be provided.

In accordance with an aspect of the disclosure, a method of controlling a screen of a portable device is provided. The method includes: detecting a touch on a text display area comprising recognizable text on an application screen displayed on the portable device; detecting continuous movement of the touch; recognizing the text in response to the continuous movement of the touch; and changing the application screen to another screen according to a control command corresponding to the recognized text, wherein the text includes one of all or some of the text within the text display area.

The speech bubble may include at least one of a speech bubble of a user and a speech bubble of a counterpart.

The continuous movement of the touch may include at least one of a single-touch gesture and a multi-touch gesture, also flick, swipe, drag, or rotation.

In accordance with another aspect of the disclosure, a method of controlling a screen of a portable device is provided. The method includes: detecting a touch in recognizable text within a text display area on an application screen displayed on the portable device; displaying a cursor in the text in response to the touch; detecting continuous movement of the touch; recognizing some of the text selected from the cursor in response to the continuous movement of the touch; and changing the application screen to another screen according to reception of a control command corresponding to the recognized text.

In accordance with another aspect of the disclosure, a portable device is provided. The portable device includes: a communication unit connected to the outside; a touch screen configured to display an application screen comprising a text display area; and a processor configured to control the communication unit and the touch screen, wherein the processor performs control to transmit text selected according to continuous movement of a touch detected in a text display area including recognizable text to the outside through the communication unit and change the application screen to another screen according to control information corresponding to a result of recognition of the text received through the communication unit.

The disclosure can provide a portable device and a method of controlling a screen of a portable device for performing switching to another screen according to a text recognition result of text selected in response to continuous movement of a touch received in text within a speech bubble displayed on a chatting application screen.

The disclosure can provide a portable device and a method of controlling a screen of a portable device for performing switching to another screen on the basis of control information provided according to a text recognition result of text selected in response to continuous movement of a touch received in text within a speech bubble displayed on a chatting application screen.

The disclosure is not limited thereto, and various embodiments of the disclosure can provide a portable device and a method of controlling a screen of a portable device for performing switching to various other screens according to a text recognition result of text selected in response to continuous movement of a touch received in text within a speech bubble displayed on a chatting application screen.

DETAILED DESCRIPTION

Figure 1:
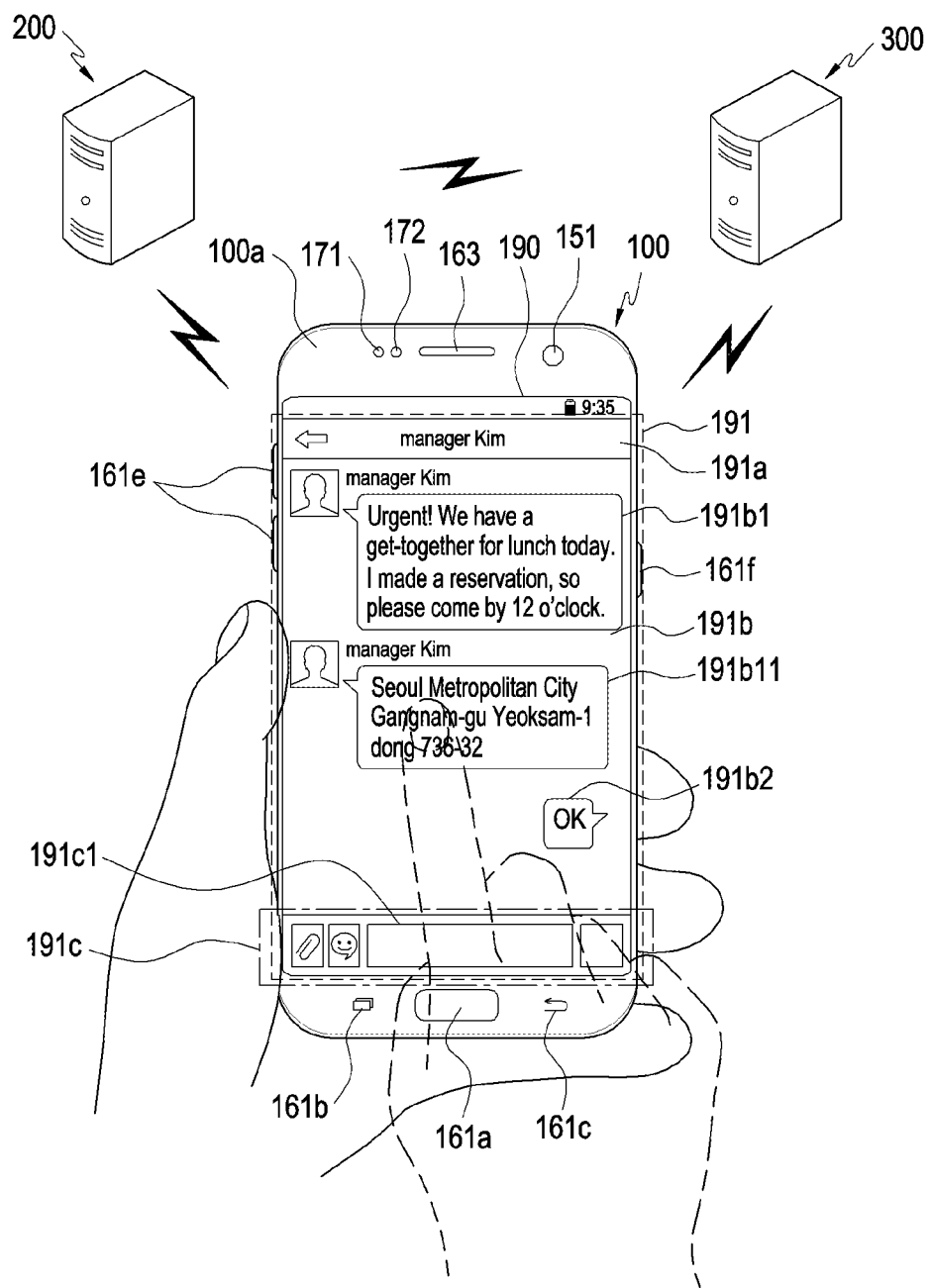
FIG. 1 schematically illustrates an operation between a portable device and a server according to an embodiment of the disclosure.

Hereinafter, exemplary embodiments of the disclosure will be described with reference to the accompanying drawings. Further, the methods of manufacturing and using the disclosure will be described in detail with reference to accompanying drawings. The same reference numerals or the signs represented in each of the drawings indicate the elements or the components that perform substantially the same functions.

Ordinal terms such as "first" and "second" may be used to describe various elements, but these elements are not limited by the terms. The above terms may be used to distinguish one element from another element. For example, a first element may be named a second element in the scope of protection of the disclosure. Further, a second element may also be named a first element. As used herein, the term "and/or" includes any and all combinations of one or more disclosed items.

An application according to an embodiment of the disclosure refers to software which is executed on an OS for a computer (or a portable device) or a mobile OS and used by a user. For example, the application may include a web browser, a mobile payment application (or an electronic payment application or a payment application), a photo album application, a word processor, a spread sheet, a contacts application, a calendar application, a memo application, an alarm application, a Social Network System (SNS) application, a game store, a chatting application, a map application, a music player, and a video player.

The application according to an embodiment of the disclosure may be software executed by a portable device or an external device (for example, a wearable device or a server) connected to the portable device wirelessly or through a wire. Further, the application according to an embodiment of the disclosure may refer to software executed by the portable device in accordance with received user input.

Content may be played or displayed through an executed application. For example, the content may include a video file or an audio file reproduced in a video player corresponding to one of the applications, a game file executed in a game application, a music file reproduced in a music player, a photo file displayed in a photo album application, a webpage file displayed in a web browser, or payment information (for example, a mobile card number, an amount to be paid, a product name, a service name, or a shop name) displayed in an electronic payment application. Further, the content may include a call screen (for example, including a caller phone number (caller ID), a caller name, a call start time, or a caller video (or a caller image) of a video call) displayed in a call application.

The content may include an executed application screen and a user interface that configures the application screen. Further, the content may include one piece of content or a plurality of pieces of content.

A widget refers to a mini application, which is one of the Graphic User Interfaces (GUIs) that more smoothly supports an interaction between the user and the application or OS. For example, the widget may include a weather widget, a calculator widget, and a clock widget.

According to an embodiment of the disclosure, a "speech bubble" may be an area in which text input by a user or a counterpart is displayed through an executed application. The "speech bubble" may be referred to as a "text display area".

According to an embodiment of the disclosure, the "user input" may be used as a term including, for example, a button (or key) selection by the user, a button (or key) press (click) by the user, a soft button (or soft key) touch by the user, a user's touch (including a non-contact touch such as hovering) received (or detected) on the touch screen, a user's touch gesture (including a non-contact gesture such as hovering) received (or detected) on the touch screen, a user's voice, a user's presence (for example, a user's presence within a camera recognition range), or a user's motion. Further, "button (or key) selection" may be used to mean pressing (or click) of a button (or a key) or touching a soft button (or a soft key).

In the disclosure, the terms are used to describe an embodiment, and are not intended to limit and/or restrict the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more other features, numeral, steps, operations, structural elements, parts, or combinations thereof. The same reference numerals represented in each of the drawings indicate the elements that perform substantially the same functions.

FIG. 1 schematically illustrates an operation between a portable device and a server according to an embodiment of the disclosure.

Referring to FIG. 1, a portable device 100 and one or a plurality of servers may be illustrated.

A touch screen 190 is located in a center area of a front surface 100a of a portable device 100. The touch screen 190 may include a flat touch screen, a curved-single-edge touch screen (not shown) extending from one side of the flat touch screen, and a curved-dual-edge touch screen extending from both sides of the flat touch screen. The touch screen 190 may be bent and folded through a thin flexible printed circuit board (not shown).

In FIG. 1, a screen 191 of a chatting application executed by user input is displayed on the touch screen 190. The chatting application screen 191 may include a title area 191a, a display area 191b, and an input area 191c. When an input window 191c1 within the input area 191c is selected, a keypad 166 (see FIG. 2) may be displayed on the touch screen 190.

In the chatting application, text input by a sender may be displayed in a speech bubble of a display area 191b (a text display area 191b1 or 191b11). The text may include a word, a sentence, or a paragraph. The text may include languages that can be supported by the chatting application, such as consonants and vowels of Hangul, the alphabet of English, Japanese, Chinese, French, and German. The speech bubble may be referred to as a text display area.

Text input by the user through the text input window 191c1 may be displayed in a speech bubble 191b2 in the display area 191b. The user may touch (or select) some of the text displayed in the speech bubbles 191b1, 191b11, and 191b2 or make continuous movement (or touch gesture) after the touch. The user may control the screen of the portable device 100 (for example, reboot, display a setting screen, or execute an application) by touching the text in the speech bubble (or through continuous movement of the touch).

A first camera 151, one or a plurality of speakers 163, an illumination sensor 171, and a proximity sensor 172 (see FIG. 2) may be located on the upper part of the front surface 100a of the portable device 100. A second camera 152 (see FIG. 2) and a flash 153 (see FIG. 2) may be located on the rear surface (not shown) of the portable device 100.

A home button 161a, a recently executed app button 161b, and a back button 161c may be located on the lower part of the front surface 100a of the portable device 100. The button 161 may include not only physical buttons (for example, the home button 161a, the power/lock button 161d, and the volume button 161*e*), but also touch buttons (for example, the home button 161*a*, the recently executed app button 161*b*, and the back button 161*c*). Further, the button 161 may be displayed along with text or another icon within the touch screen 190.

The power/lock button 161*d* and the volume button 161*e* may be located on the side surface of the portable device 100. The side surface of the portable device 100 may connect the front surface 100*a* and the rear surface of the portable device 100, and may include a left side surface, a right side surface, an upper end, and a lower end.

One or a plurality of microphones 162 (see FIG. 2) may be located on the upper end, the side surface, and/or the lower end of the portable device 100. A connector 165 and/or a speaker 163 may be located on the upper end, the side surface, and/or the lower end of the portable device 100. Further, an insertion hole (not shown), into which an input pen 167 (see FIG. 2) having a button (not shown) can be inserted, may be located on the upper end or the lower end of the portable device 100. The input pen 167 (see FIG. 2) may be stored within the portable device 100 through the insertion hole (not shown), and removed from the portable device 100 for use.

A text recognition server 200 may convert an electrical signal (for example, a packet corresponding to an electrical signal) corresponding to text selected by the portable device 100 into text data (for example, text or code) generated through text recognition. The converted text data may be transmitted to a control server 300 via the portable device 100 or may be directly transmitted to the control server 300.

The control information server 300 may convert the converted text data into control information (for example, a control instruction for controlling the portable device 100) which can be recognized by the portable device 100. The control information may be transmitted from the control information server 300 to the portable device 100. A detailed description of the text recognition server 200 and the control information server 300 will be made below.

Figure 2:
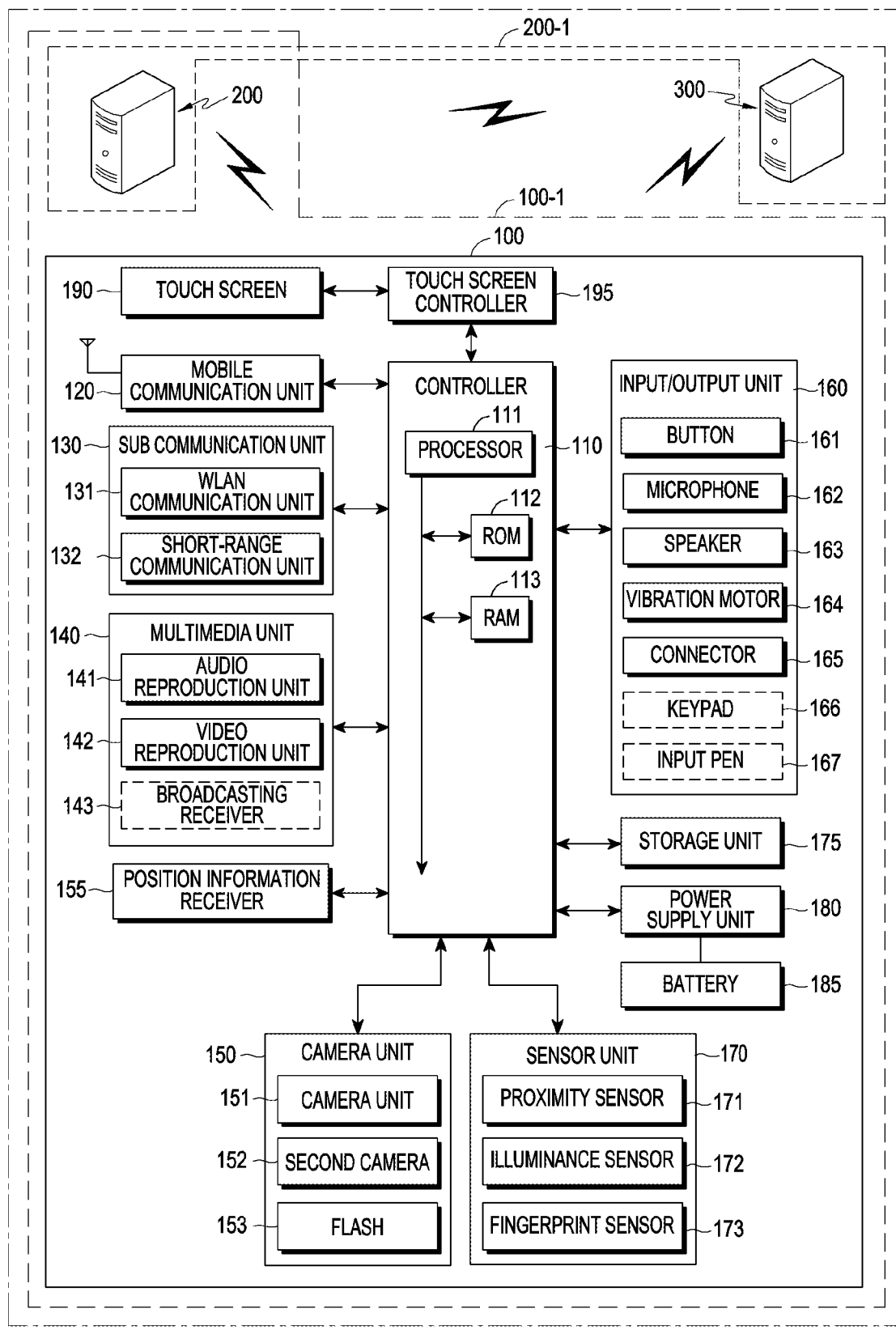
FIG. 2 is a block diagram schematically illustrating a portable device and a server according to an embodiment of the disclosure.

FIG. 2 is a block diagram schematically illustrating a portable device and a server according to an embodiment of the disclosure.

Referring to FIGS. 1 and 2, the portable device 100 may be functionally connected to another device (for example, another portable device or a server) through at least one of a mobile communication unit 120, a sub communication unit 130, and a connector 165.

The portable device 100 may include the touch screen 190, and may transmit data to another device or receive data from another device through the communication unit 120 or 130. The portable device 100 may include the input pen 167 and the touch screen 190, and may transmit data to the outside or receive data from the outside through the communication unit 120 or 130.

The portable device 100 includes a controller 110, the mobile communication unit 120, the sub communication unit 130, a multimedia unit 140, a camera 150, a positioning information receiver 155, an input/output unit 160, a sensor unit 170, a storage unit 175, and a power supply unit 180. Further, the portable device 100 includes the touch screen 190 and a touch screen controller 195.

The controller 110 may include a processor 111. The controller 110 may further include a Read-Only Memory (ROM) 112, which stores a control program for control of the portable device 100, and a Random Access Memory (RAM) 113, which stores signals or data input from outside the portable device 100, or is used as a storage region for various tasks performed by the portable device 100.

The controller 110 performs a function of controlling the general operation of the portable device 100 and a signal flow between internal elements 110 to 195 of the portable device 100 and processing data. The controller 110 controls power supply to the internal elements 120 to 195 through the power supply unit 180.

The processor 111 may include a Graphic Processing Unit (GPU) (not shown) for graphic processing. Further, the processor 111 may further include a sensor processor (not shown) for controlling a sensor or a communication processor (not shown) for controlling communication.

The processor 111 may be implemented in the form of a System on Chip (SoC) including a core (not shown) and a GPU (not shown). The processor 111 may include a single core, a dual core, a triple core, a quadruple core, and a number of cores equal to a multiple thereof.

The processor 111, the ROM 112, and the RAM 113 may be connected with each other through buses.

The controller 110 may control the mobile communication unit 120, the sub communication unit 130, the multimedia unit 140, the camera 150, the positioning information receiver 155, the input/output unit 160, the sensor unit 170, the storage unit 175, the power supply unit 180, the touch screen 190, and the touch screen controller 195.

According to an embodiment of the disclosure, the term "controller of the portable device" may include the processor 111, the ROM 112, and the RAM 113. Further, the term "controller of the portable device" may include the processor 111.

The mobile communication unit 120 may be connected to another device through a mobile communication network using one or more antennas under the control of the controller 110.

The sub communication unit 130 may be connected to another device through a WLAN communication unit 131 and/or a short-range communication unit 132 using one or more antennas under the control of the controller 110. The sub communication unit 130 may include an antenna for the wireless LAN, an antenna for Magnetic Secure Transmission (MST) for electronic payment, or an antenna for Near Field Communication (NFC).

The WLAN communication unit 131 may be wirelessly connected to an Access Point (AP) in a place where the AP is installed under the control of the controller 110. The WLAN communication unit 131 may support, for example, Wi-Fi communication.

The short-range communication may include Bluetooth communication, Bluetooth low energy communication, Infrared Data Association (IrDA) communication, Ultra-Wideband (UWB) communication, MST communication and/or NFC.

The portable device 100 may include one of the mobile communication unit 120, the WLAN communication unit 131, and the short-range communication unit 132 or a combination of the mobile communication unit 120, the WLAN communication unit 131, and the short-range communication unit 132 according to a function and/or performance thereof. According to various embodiments of the disclosure, the term "communication unit" may include the mobile communication unit 120 and/or the sub communication unit 130.

The multimedia unit 140 may reproduce audio data, reproduce a video, and/or receive an external broadcast under the control of the controller 110.

An audio reproduction unit 141 may reproduce an audio source (for example, an audio file including file extensions such as mp3, wma, ogg, or wav) pre-stored in the storage unit 175 of the portable device 100 or received from the outside using an audio codec under the control of the controller 110.

According to various embodiments of the disclosure, the audio reproduction unit 141 may reproduce auditory feedback corresponding to a change to another screen according to continuous movement of a touch received in text within the speech bubble. For example, the audio reproduction unit 141 may reproduce auditory feedback (for example, output of an audio source stored in the storage unit 175) corresponding to a change to another screen according to continuous movement of the touch received in text within the speech bubble through an audio codec under the control of the controller 110.

A video reproduction unit 142 may reproduce a digital video source (for example, a video file including file extensions such as mpeg, mpg, mp4, avi, mov, or mkv) pre-stored in the storage unit 175 of the portable device 100 or received from the outside using the video codec under the control of the controller 110.

According to various embodiments of the disclosure, the video reproduction unit 142 may reproduce visual feedback corresponding to a change to another screen according to continuous movement of the touch received in text within the speech bubble. For example, the visual feedback (for example, output of a video source stored in the storage unit 175) may be reproduced through a video codec under the control of the controller 110.

A broadcasting receiver 143 may receive a broadcasting signal (for example, a TV broadcasting signal, a radio broadcasting signal, or a data broadcasting signal) and supplemental broadcasting information (for example, an Electronic Program Guide: EPG or an Electronic Service Guide: ESG) output from an external broadcasting station through an antenna (not shown) under the control of the controller 110.

The multimedia unit 140 may include the audio reproduction unit 141 and the video reproduction unit 142, except for the broadcasting receiver 143, in accordance with the performance or structure of the portable device 100. Further, the controller 110 may be implemented to include at least one of the audio reproduction unit 141 and the video reproduction unit 142 of the multimedia unit 140.

The camera 150 may photograph a still image or a video under the control of the controller 110. The camera 150 includes a first camera 151 located on the front surface and a second camera 152 located on a rear surface. The first camera 151 or the second camera 152 may include an auxiliary light source (for example a flash 153) providing an amount of light required for photography.

The camera 150 may include the first camera 151 located on the front surface of the portable device 100 and may further include an additional camera (for example, a third camera) (not shown) adjacent to the first camera 151 (the interval between the two optical axes may, for example, be longer than 5 mm and shorter than 80 mm). The camera 150 may further include an element obtained by implementing the first camera 151 and the third camera as one unit. The controller 110 may photograph a 3D still image or a 3D video through the first camera 151 and the third camera.

The camera 150 may include the second camera 152 located on the rear surface of the portable device 100 and may further include an additional camera (for example, a fourth camera) (not shown)) adjacent to the second camera 152 (the interval between the two optical axes may, for example, be longer than 5 mm and shorter than 80 mm). The camera 150 may further include an element obtained by implementing the second camera (not shown) and the fourth camera as one unit. The controller 110 may photograph a 3D still image or a 3D video through the second camera 152 and the fourth camera. The camera 150 may perform wide-angle photographing, telephoto photographing, or close-up photographing by using an additional lens (not shown) attachable to/detachable from a separate adaptor (not shown).

The positioning information receiver 155 periodically receives a signal (for example, orbit information of a satellite, time information of a satellite, and a navigation message) from a plurality of satellites (not shown) orbiting around the Earth.

The portable device 100 may measure the locations of each satellite and the portable device 100 on the basis of the signals received from the plurality of satellites and thus obtain the distance on the basis of the transmission/reception time difference. The location, time, or movement speed of the portable device 100 may be calculated through triangulation. An additional satellite may be required to compensate for the orbit or time.

In the indoor case, the portable device 100 may detect the location or movement speed of the portable device 100 through a wireless AP. The detection of the location of the portable device 100 indoors may use a cell-ID scheme, an enhanced cell-ID scheme, or an Angle of Arrival (AoA) scheme. Further, the portable device 100 may detect the location or movement speed of the portable device 100 located indoors using a wireless beacon (not shown).

The input/output unit 160 may include at least one of one or more buttons 161, one or more microphones 162, one or more speakers 163, one or more vibration motors 164, a connector 165, a keypad 166, and the input pen 167.

Referring to FIGS. 1 and 2, the button 161 may receive a user input. The button 161 may include a home button 161a located on the lower part of the front surface of the portable device 100, a recently executed app button 161b, and/or a back button 161c. The button 161 may include one or a plurality of volume buttons 161d and a power/lock button 161e located on the side surface of the portable device 100. Further, the button 161 may include only the home button 161a, the volume button 161d, and the power/lock button 161e.

Some of the buttons 161 (for example, the buttons 161a, 161b, 161c, and other buttons which are not shown) may be implemented not only as a physical button but also as a touch button. Some of the buttons 161 (for example, the buttons 161a, 161b, and 161c) may be displayed on the touch screen 190 in the form of a text, image, or icon.

The controller 110 may receive an electrical signal transmitted from the button 161 in response to reception of user input. The controller 110 may detect user input on the basis of a received signal (for example, pressing of the button 161).

The shapes, locations, functions, and names of the buttons 161 illustrated in FIGS. 1 and 2 are examples for description, and changes, transformations, and modifications thereto, without limiting the disclosure, may be easily understood by those skilled in the art.

The microphone 162 generates a voice or a sound received from the outside in the form of an electrical signal under the control of the controller 110. The electrical signal generated by the microphone 162 may be converted by the audio codec and stored in the storage unit 175 or output through the speaker 163 under the control of the controller 110.

Referring to FIGS. 1 and 2, the microphone 162 may be located on the front surface, the side surface, and/or the rear surface of the portable device 100.

The speaker 163 may output sounds corresponding to various signals (for example, a wireless signal, a broadcasting signal, an audio source, a video file, and taking a picture) decoded by the audio codec under the control of the controller 110.

Referring to FIGS. 1 and 2, one or a plurality of speakers 163 may be located on the front surface, the side surface, and/or the rear surface of the portable device 100. Further, a plurality of speakers (not shown) may be located on the side surface of the portable device 100.

According to an embodiment of the disclosure, the speaker 163 may output auditory feedback corresponding to a change to another screen according to continuous movement of a touch received in text within the speech bubble. For example, the speaker 163 may output auditory feedback corresponding to a change to another screen according to continuous movement of a touch received in text within the speech bubble under the control of the controller 110.

A vibration motor 164 converts an electrical signal into mechanical vibration under the control of the controller 110. The vibration motor 164 may include a linear vibration motor, a bar-type vibration motor, a coin-type vibration motor, or a piezoelectric element vibration motor.

One or more of vibration motors 164 may be located inside the portable device 100. The vibration motor 164 may vibrate the whole portable device 100 or may locally vibrate only a portion of the portable device 100.

According to an embodiment of the disclosure, the vibration motor 164 may output tactile feedback corresponding to a change to another screen according to continuous movement of a touch received in text within the speech bubble. Further, the vibration motor 164 may provide various kinds of tactile feedback (for example, a vibration strength and a vibration duration time) pre-stored or received from the outside based on a control command of the controller 110.

The connector 165 may be used as an interface for connecting the portable device 100 and an external device (not shown) or a power source (not shown). For example, the connector 165 may include a micro-USB-type connector or a USB—C-type connector.

The keypad 166 receives user input for controlling the portable device 100. The keypad 166 has a button (or a key) and may include one of a virtual keypad (not shown) displayed within the touch screen 190, a pressure touch keypad (not shown) corresponding to the pressure (or force) applied to the user input, and a physical keypad (not shown) located in a lower area of the front surface of the portable device 100.

The keypad 166 may further include a separate keypad (or a keyboard) (not shown) using short-range communication or connectable through a wire.

The input pen 167 may be inserted into/withdrawn from one of the side surface and the rear surface of the portable device 100, may select (or touch) objects (for example, a menu, text, an image, a video, a figure, an icon, and a shortcut icon) included (or displayed) in the touch screen 190 of the portable device 100 or a handwriting/drawing application screen (for example, a memo screen, a notepad screen, or a calendar screen) displayed on the touch screen 190 by the user and/or content (for example, a text file, an image file, an audio file, a video file, payment information, or a webpage), or may perform handwriting or drawing (painting or sketching).

The sensor unit 170 may detect a state (for example, a slot (or an angle) or shaking) of the portable device 100 through one or a plurality of sensors.

The sensor unit 170 may include a proximity sensor 171 for detecting whether the user approaches the portable device 100, an illuminance sensor 172 for detecting the amount of light around the portable device 100, and/or a fingerprint sensor 173 for scanning a user's fingerprint.

At least one of the proximity sensor 171 and the illuminance sensor 172 may be located on the front surface of the portable device 100.

The fingerprint sensor 173 may be located on a button (for example, a home button) on the front surface of the portable device 100, a button (for example, a power button) on the side surface of the portable device 100, or the rear surface of the portable device 100. Further, the fingerprint sensor may be located in a partial area of the touch screen 190 of the portable device 100 (for example, an area adjacent to the home button 161a inside the touch screen 190) (not shown) and may scan a user's fingerprint.

The sensor unit 170 may further include an acceleration sensor (not shown), a geomagnetic sensor (not shown), a gyro sensor (not shown), a gravity sensor (not shown), or an altimeter (not shown). Further, the sensor unit 170 may further include a biometric signal sensor (not shown) including a heartbeat sensor (not shown).

The sensor included in the sensor unit 170 detect the state of the user (for example, the body temperature, heart rate, and brainwaves) and the state of the portable device 100, generate an electrical signal corresponding to the detection, and transmit the generated electrical signal to the controller 110. It is easily understood by those skilled in the art that the sensors included in the sensor unit 170 can be added, changed, or deleted depending on the performance of the portable device 100.

The storage unit 175 may store signals or data input/output in accordance with the operation of the elements 110 to 195 under the control of the controller 110. The storage unit 175 may store a Graphical User Interface (GUI) related to a control program for control of the portable device 100 or the controller 110 and an application provided from a manufacturer or downloaded from the outside, images corresponding to the GUI, user information, documents, databases, or relevant data.

The storage unit 175 may store visual feedback (for example, a video source) which is output in accordance with a change to another screen according to continuous movement of a touch received in text within the speech bubble and thus can be recognized by the user, auditory feedback (for example, a sound source) which is output from the speaker 163 and thus can be recognized by the user, and tactile feedback (for example, a haptic pattern) which is output from the vibration motor 164 and thus can be recognized by the user.

The storage unit 175 may store a feedback provision time (for example, 500 ms) of the feedback provided to the user.

According to an embodiment of the disclosure, the term "storage unit" includes the storage unit 175, the ROM 112 and the RAM 113 within the controller 110, or a memory card (not shown) (for example, a micro SD card) installed in the portable device 100. The storage unit 175 may include nonvolatile memory, volatile memory, a Hard Disk Drive (HDD), or a Solid-State Drive (SSD).

The power supply unit 180 may supply power to the elements 110 to 195 of the portable device 100 under the control of the controller 110. The power supply unit 180 may supply power, input from an external power source (not shown) through a wired cable (not shown) connected to the connector 165, to each element of the portable device 100 under the control of the controller 110. The power supply unit 180 may charge one or more batteries 185 under the control of the controller 110.

The power supply unit 180 may supply the charged power of the battery 185 to an accessory device (for example, a clock) (not shown) through a cable. Further, the power supply unit 180 may wirelessly charge another portable device or an accessory device (not shown) through a separate transmission coil (not shown) functionally connected to the battery 185 under the control of the controller 110. A wireless charging scheme may include, for example, a magnetic resonance scheme, an electromagnetic wave scheme, or a magnetic induction scheme.

The touch screen 190 may provide a Graphical User Interface (GUI) corresponding to various services (for example, a voice call, a video call, data transmission, broadcast reception, photo capture, video viewing, or mobile payment) to the user. The touch screen 190 includes a touch panel (not shown) for receiving a user input (for example, a touch) and a display panel (not shown) for displaying a screen. The touch panel may include a capacitive touch panel, a resistive touch panel, or an ultrasonic touch panel.

The touch screen 190 may transmit an analog signal corresponding to a single touch (or a multi-touch) or a single-touch gesture (or a multi-touch gesture), input through a screen of an executed application or a GUI, to the touch screen controller 195. The touch screen 190 may receive the single touch or the multi-touch through a user's body (for example, fingers including the thumb) or the input pen 167.

The touch screen 190 according to an embodiment of the disclosure may output tactile visual feedback corresponding to a change to another screen according to continuous movement of a touch received in text within the speech bubble. According to an embodiment of the disclosure, a display unit may have a meaning including the touch screen 190.

When the user strongly presses the touch screen 190 (with, for example, an intensity larger than a threshold value), a pressure touch pad for detecting the pressure applied to the touch screen 190 (including a force touch pad, a pressure sensor, or an electrode for detecting applied pressure (or an electrode layer or a force touch pad) (not shown)) may be located below the touch screen 190. When the pressure touch pad receives pressure (or a touch) larger than a threshold value (for example, 50% of capacitance or 50% of voltage (or current) capable of being changed by touch input on the touch screen 190), the controller 110 may detect a received pressure touch (or a force touch).

The threshold value, the capacitance, and/or the voltage (or current) is only one embodiment, and it may be easily understood by those skilled in the art that the threshold value, the capacitance, and/or the voltage (or current) can be changed according to the structure and/or function of the portable device 100 (for example, the threshold value may be changed and the detectable capacitance may be changed).

The touch screen controller 195 may convert an analog signal corresponding to a single touch (or a multi-touch) or a single-touch gesture (or a multi-touch gesture) received by the touch screen 190 into a digital signal and transmit the digital signal to the controller 110. The controller 110 may obtain the touch location (for example, X and Y coordinates) of a touch received by the touch screen 190 on the basis of the digital signal received by the touch screen controller 195.

The controller 110 may control the touch screen 190 on the basis of the digital signal received from the touch screen controller 195. For example, the controller 110 may display shortcut icons such that a shortcut icon (also referred to as an icon) displayed on the touch screen 190 in response to an input touch is distinguished from other shortcut icons which are not selected or may display a game application screen on the touch screen 190 by executing an application (for example, a game application) corresponding to the selected shortcut icon.

The text recognition server 200 receives a signal (or a packet) corresponding to continuous movement of a touch from the portable device 100 through a communication unit (not shown). A controller (not shown) of the text recognition server 200 may recognize text by analyzing a received packet through a text recognition algorithm.

The controller of the text recognition server 200 may convert a received electrical signal (or a packet corresponding to the electrical signal) into text recognition data (or text data) including text in the form of a phoneme, a word, or a sentence through the text recognition algorithm.

The controller of the text recognition server 200 may transmit text data to the portable device 200 and/or the control information server 300 through a communication unit (not shown).

A controller (not shown) of the control information server 300 may determine (select, convert, or generate) control information (for example, a control instruction) on the basis of the text data. The control information may control a screen (operation or function) of the portable device 100. The controller of the control information server 300 may transmit the control information to the portable device 200 through a communication unit (not shown).

According to an embodiment of the disclosure, the text recognition server 200 may be implemented with the portable device 100 in an integrated form 100-1. The text recognition server 200 may be included in the portable device 100 (for example, an integrated portable device 100-1) as an element separate from the elements 110 to 195 of the portable device 100. For example, the text recognition server 200 may be embedded into the storage unit 175 of the portable device 100 or may be implemented in a separate storage unit (not shown).

According to another embodiment of the disclosure, the text recognition server 200 and the control information server 300, which are separate from each other, may be implemented in an integrated form 200-1. The integrated text recognition server 200 may convert recognized text data into control information. The integrated text recognition server 200 may convert received text data into control information. The integrated text recognition server 200 may transmit control information to the portable device 100 through a communication unit.

It may be easily understood by those skilled in the art that the elements of the portable device 100 illustrated in FIGS. 1 and 2 may further include at least one additional element (for example, a separate touch screen), or at least one element may be omitted (for example, an element marked with dotted lines in FIG. 2) or may be changed.

Figure 3:
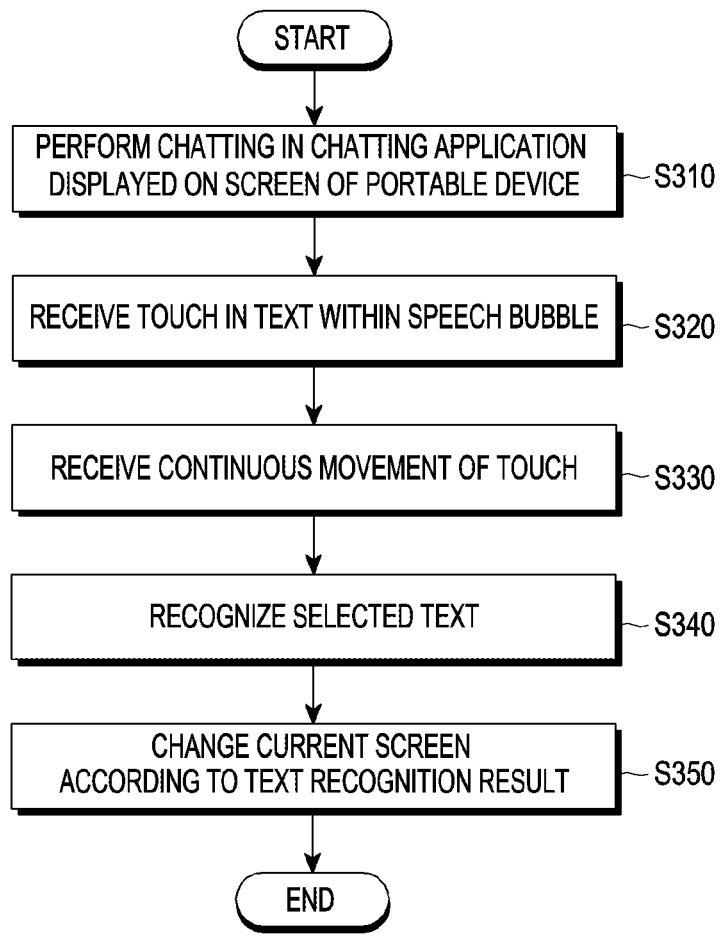
FIG. 3 is a flowchart schematically illustrating a method of controlling a screen of a portable device according to an embodiment of the disclosure.

FIG. 3 is a flowchart schematically illustrating a method of controlling a screen of a portable device according to an embodiment of the disclosure.

FIGS. 4A to 4E illustrate an example of the method of controlling the screen by the portable device according to an embodiment of the disclosure.

FIGS. 5A to 5F illustrate an example of the method of controlling the screen by the portable device according to another embodiment of the disclosure.

In step S310 of FIG. 3, chatting is performed in a chatting application displayed on the screen of the portable device.

Figure 4A:
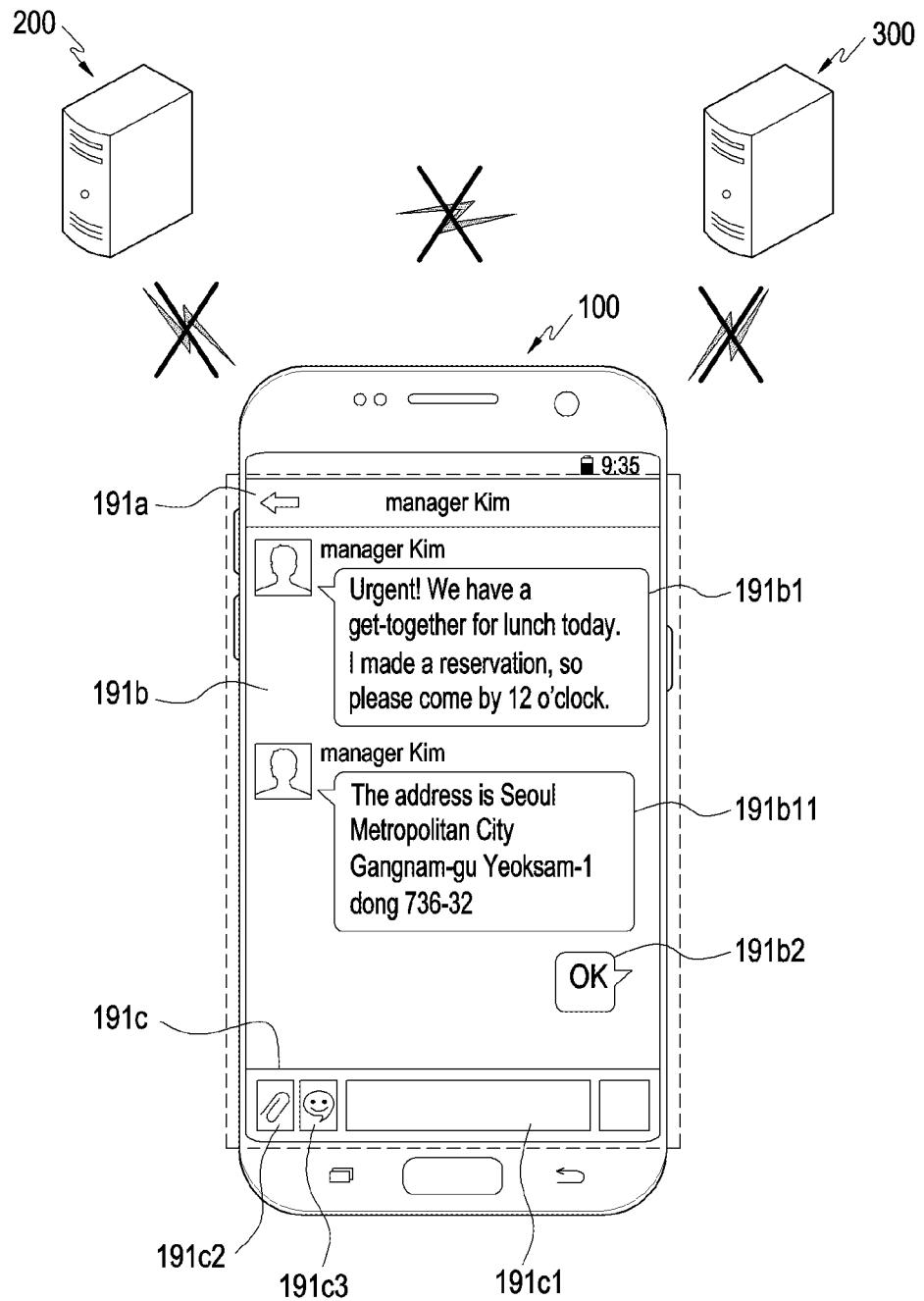
FIGS. 4A to 4E illustrate an example of the method of controlling the screen by the portable device according to an embodiment of the disclosure.

Referring to FIG. 4A, a chatting application screen 191 is displayed on the touch screen 190 of the portable device 100. The chatting application screen 191 may include a title area 191a, a display area 191b, and an input area 191c. The name of a chatting counterpart may be displayed in the title area 191a (or the counterpart can be identified through a nickname or an appellation).

Speech bubbles 191b1 to 191b exchanged between a user and a counterpart (one of a sender and a receiver) may be displayed in the display area 191b. Text (for example, consonants, vowels, words, sentences, or paragraphs) input by the counterpart or the user may be displayed in the speech bubble. Further, an icon (shortcut icon), a symbol, an emoticon, or an image (for example, a small image such as a thumbnail image) may be further displayed in the speech bubble.

The user may input text through a text input window 191c1 of the input area 191c. The user may input an icon (shortcut icon), a symbol, an emoticon, or an image (for example, a small image such as a thumbnail image) through each input window 191c2 or 191c3 of the input area 191c. When the user selects the input window 191c1, the keypad 166 may be displayed on the touch screen 190.

The user may input text by touching the keypad 166 (or making a touch gesture) using a body part including a thumb and/or the input pen 167. The user may input text with a voice through the microphone 162. Further, the user may input text with motion through the sensor 170.

Figure 5A:
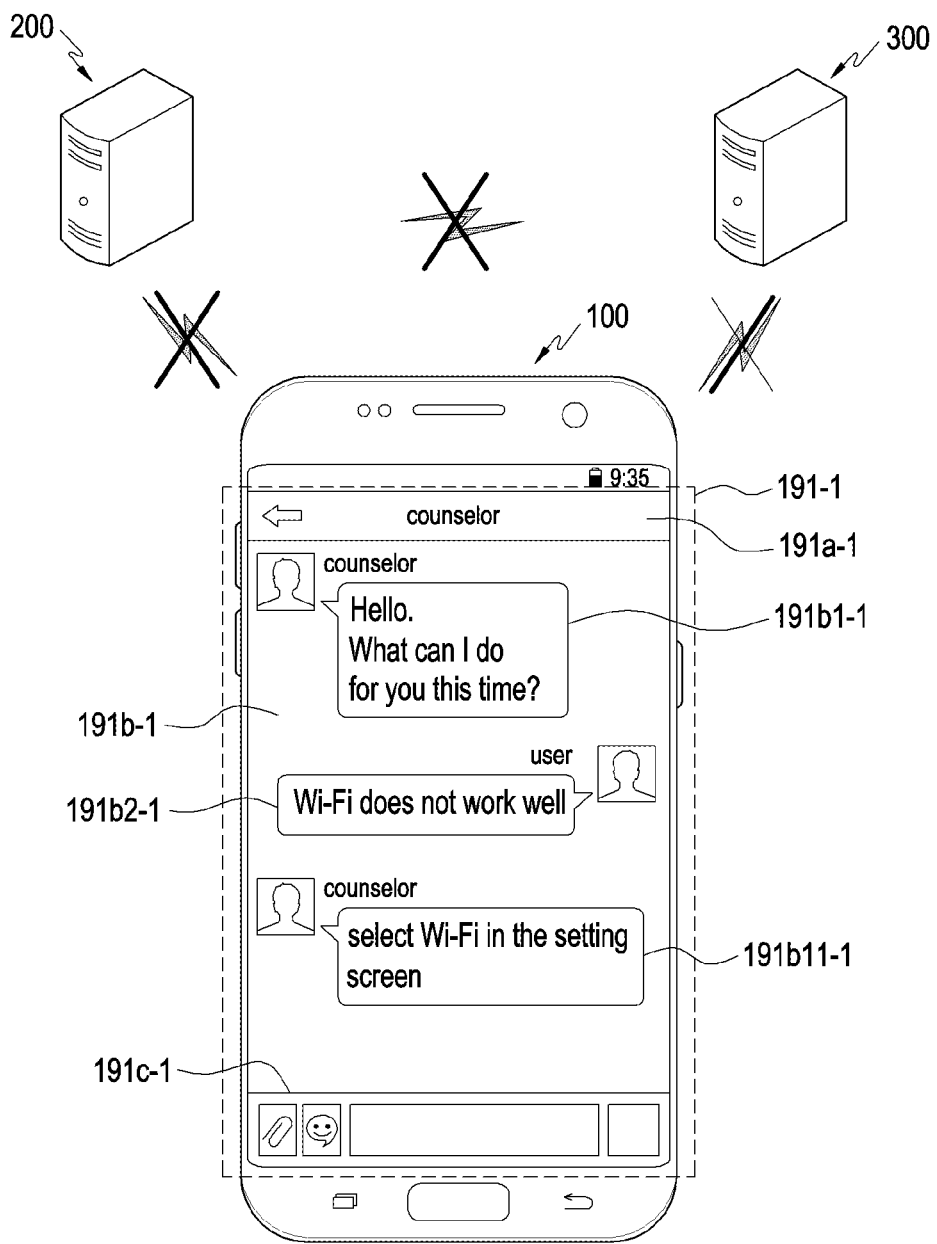
FIGS. 5A to 5F illustrate an example of the method of controlling the screen by the portable device according to another embodiment of the disclosure.

Referring to FIG. 5A, which is another embodiment of the disclosure, chatting is performed in the chatting application displayed on the screen of the portable device.

Speech bubbles 191b-1 to 191b2-1 exchanged between a user and a counterpart (one of a sender and a receiver) may be displayed in the display area 191b-1.

Since the chatting (corresponding to FIG. 5A) in the chatting application displayed on the screen of the portable device in step S310 of FIG. 3 is substantially similar to the chatting (corresponding to FIG. 4A) in the chatting application displayed on the screen of the portable device in step S310 of FIG. 3, an overlapping description is omitted.

In step S320 of FIG. 3, a touch is received in text within the speech bubble.

Figure 4B:
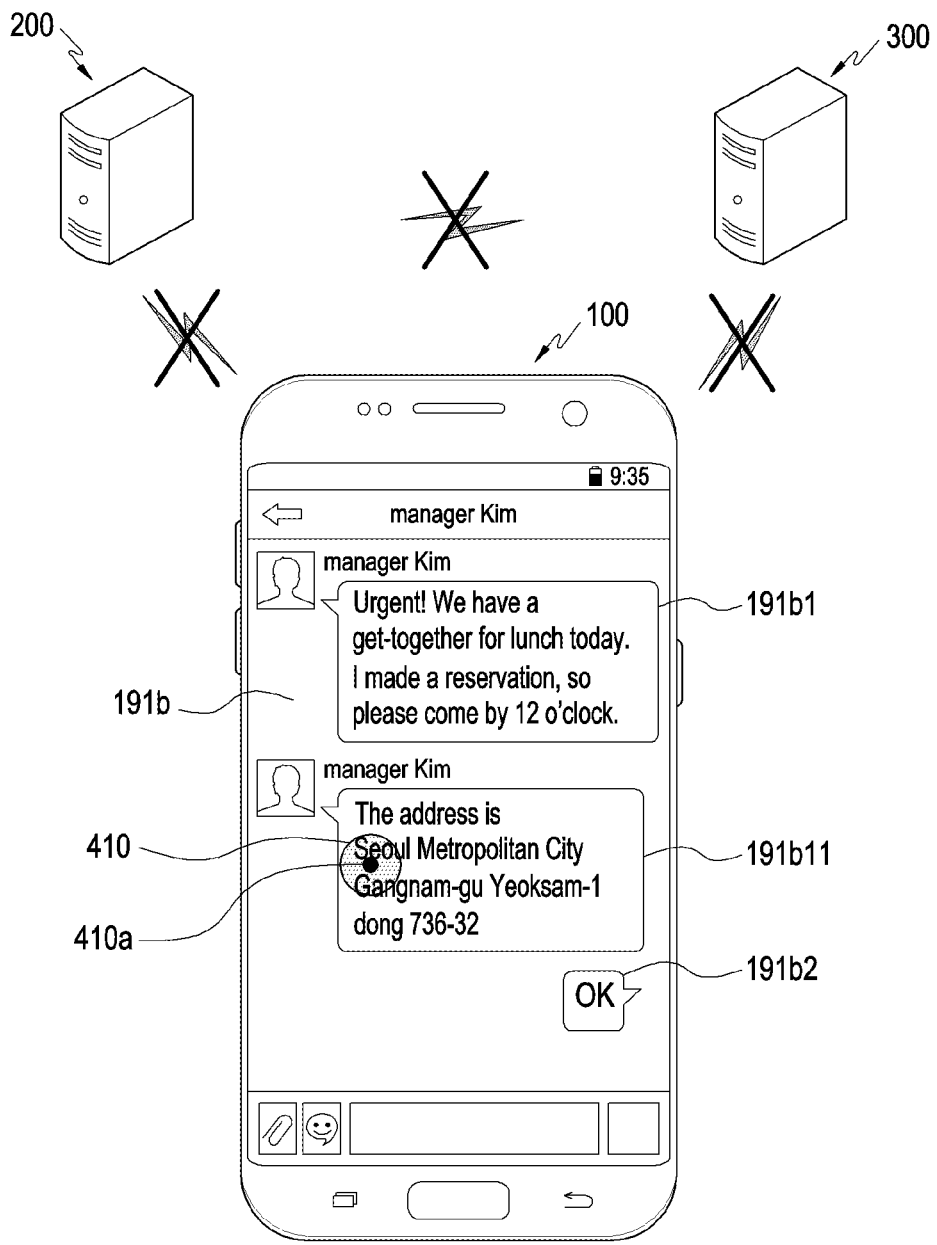

Referring to FIGS. 4A and 4B, the user inputs a touch 410 (including hovering) in the speech bubble 191b11. The touch 410 may include a tap or a double tap. The user may touch each of the speech bubbles 191b1-1 to 191b2-1 displayed on the chatting application screen. The user may touch all of the speech bubbles (for example, a user's speech bubble or a counterpart (for example, manager Kim)'s speech bubble) displayed on the chatting application screen.

The controller (or processor) may detect the touch 410 through the touch screen 190 and the touch screen controller 195. The controller (or processor) may obtain the touch location 410a (for example, X1 and Y1 coordinates) corresponding to the touch 410 on the basis of an electrical signal received from the touch screen controller 195. The obtained touch location 410a may be determined as the initial touch location.

The controller 110 may store the touch location 410a, a detection time of the touch (for example, 9:35 a.m.), a pressure value of the touch, and pressure touch information corresponding to an electrical signal corresponding to the touch in the storage unit 175. The touch 410 may be generated by, for example, one of the fingers, including a thumb, or the input pen 167.

A cursor (not shown) may be displayed at the initial touch location 410a detected in text to be recognized. Text to be recognized may be selected in response to continuous movement of the touch from the displayed cursor (for example, movement 410-1 from the initial location 410a to the final location 410b).

The user inputs a pressure touch (not shown) in the speech bubble 191b11. The controller 110 may detect a pressure touch through a pressure touch panel (not shown), the touch screen 190 and/or the touch screen controller 195. The pressure touch may be detected through the pressure touch panel. The pressure touch panel may include, for example, a lower part of the touch screen 190, the inside of the touch screen 190, a lower part of a display panel (not shown), or an upper part of a touch panel (not shown). The pressure touch panel may be distinguished from the touch screen 190. Further, the pressure touch panel may be included in the touch screen 190.

The pressure of the pressure touch may be detected through the pressure touch panel. The pressure touch panel may transmit an electrical signal corresponding to input pressure (for example, between 0 V and 3 V in the case of a voltage, which varies according to the portable device) to the controller 110. The controller 110 may calculate pressure on the basis of the received electrical signal. Further, the controller 110 may map corresponding pressure to the received electrical signal.

Figure 5B:
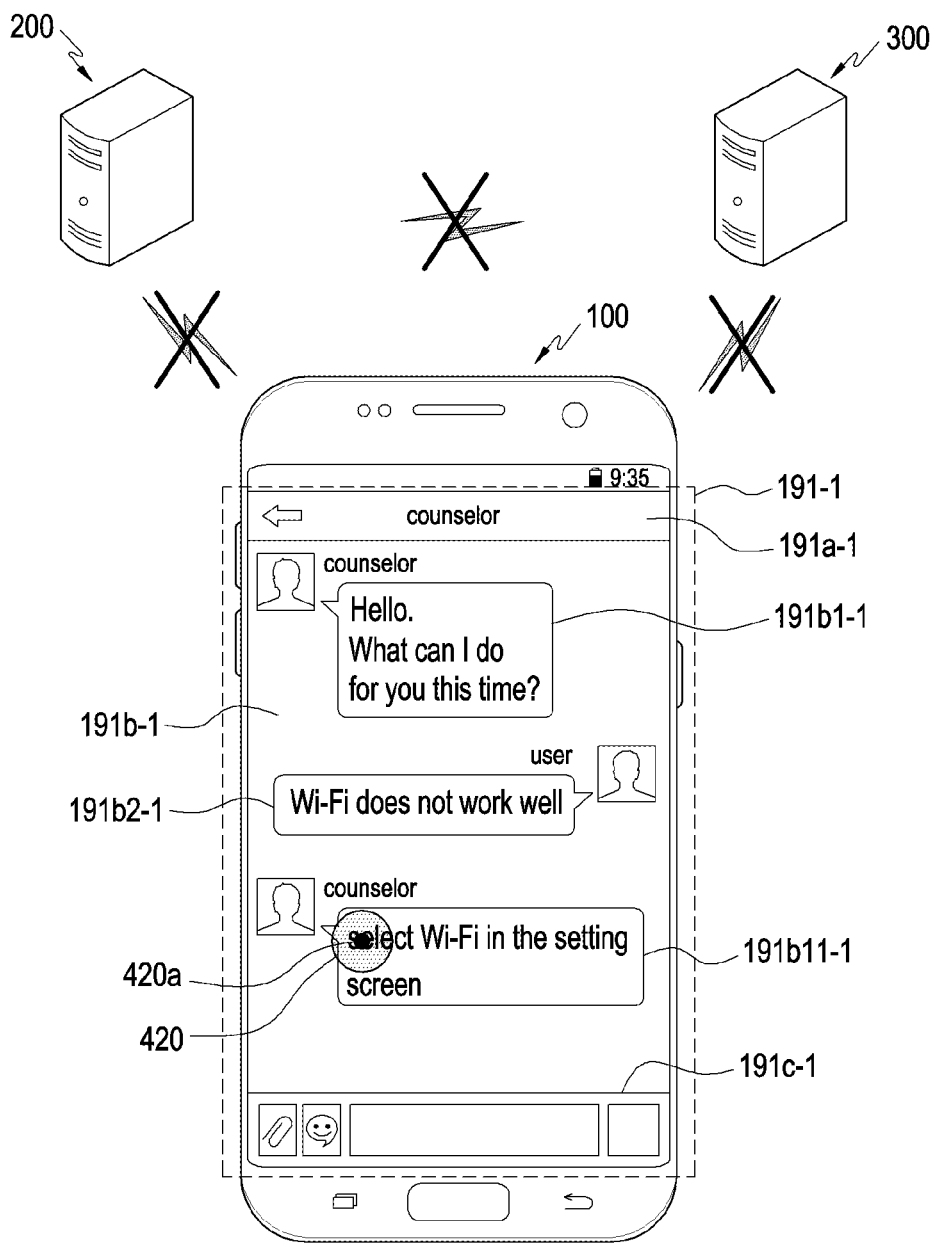

Referring to FIGS. 5A and 5B, which are another embodiment of the disclosure, a touch is received in text within the speech bubble.

The controller 110 may detect a touch 420 through the touch screen 190 and the touch screen controller 195. The controller 110 may obtain the touch location 420a (for example, X2 and Y2 coordinates) corresponding to the touch 420 on the basis of an electrical signal received from the touch screen controller 195. The obtained touch location 420a may be determined as the initial touch location.

Since reception of the touch (corresponding to FIGS. 5A and 5B) in text within the speech bubble in step S320 of FIG. 3 is substantially similar to reception of the touch (corresponding to FIGS. 4A and 4B) in text within the speech bubble, an overlapping description is omitted.

In step S330 of FIG. 3, continuous movement of the detected touch is received.

Figure 4C:
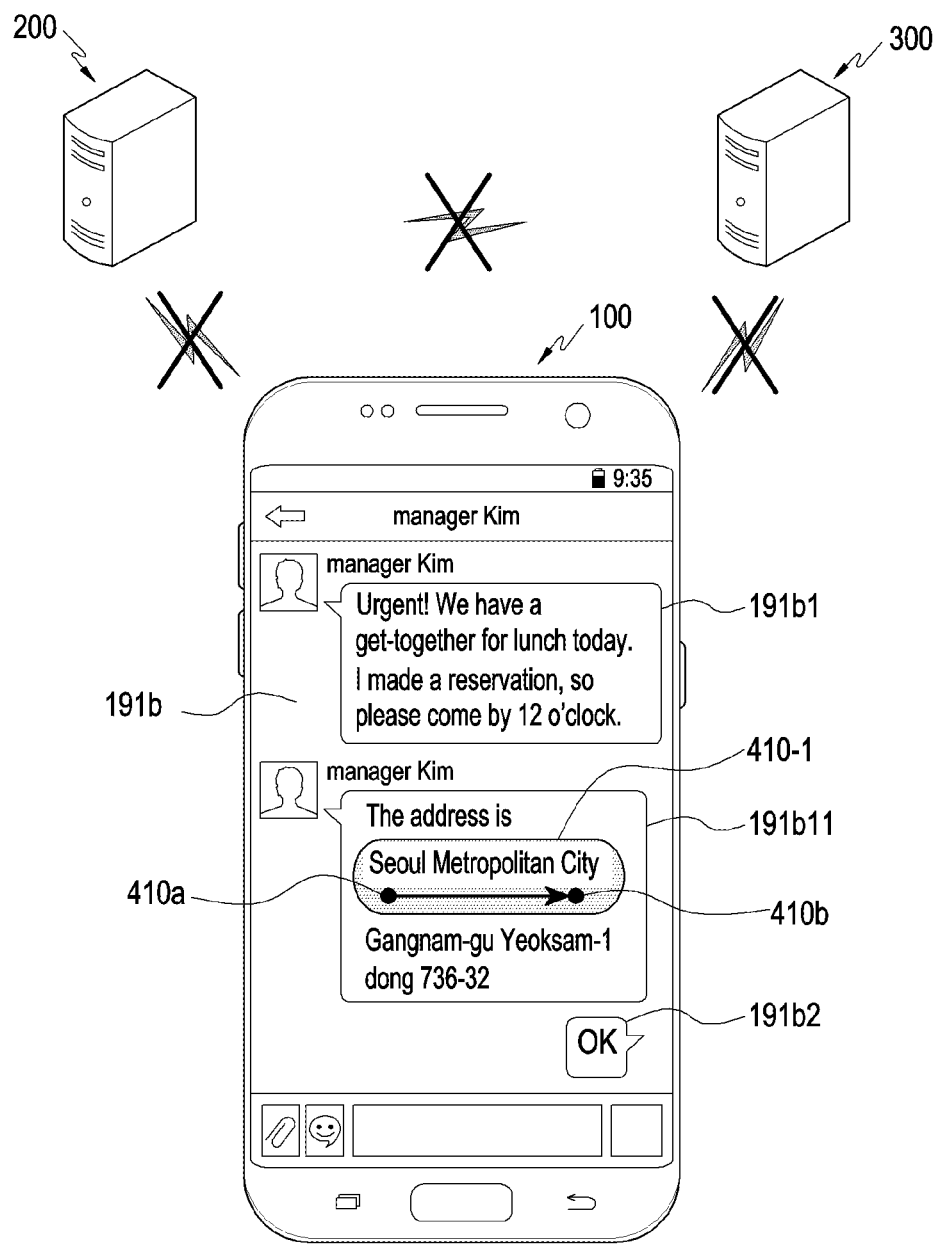
Figure 4D:
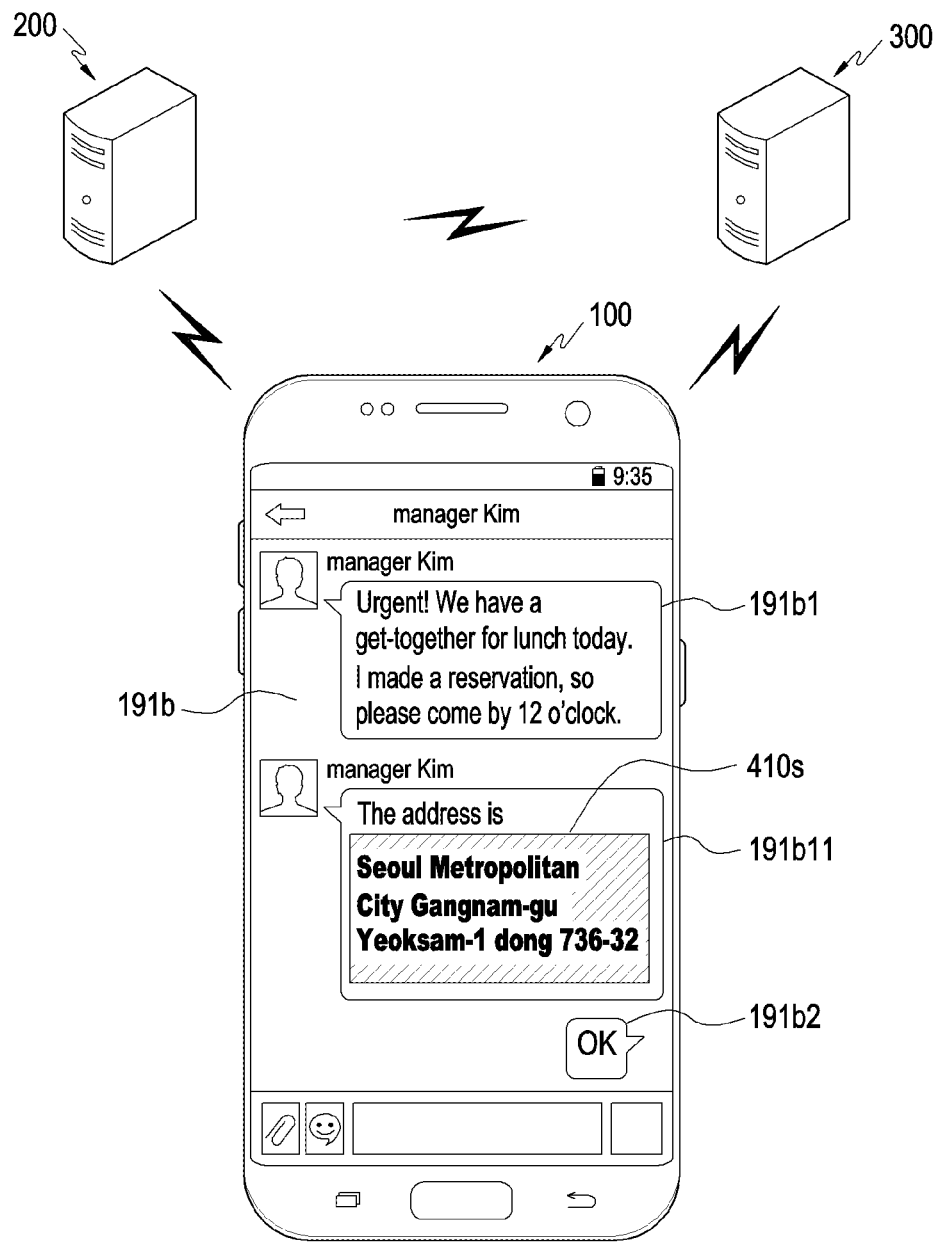

Referring to FIGS. 4C and 4D, the user inputs continuous movement of the touch (for example, a plurality of X coordinates and Y coordinates 410-1 corresponding to the continuous touch 410a to 410b) in the speech bubble 191b11. The user may maintain the touch 410 at the initial touch location 410a for a preset time (for example, 500 ms or shorter, but changeable). After maintaining the touch 410 at the initial touch location 410a, the user may input continuous movement of the touch (for example, the plurality of X coordinates and Y coordinates 410-1 corresponding to the continuous touch 410a to 410b).

The controller 110 may detect the continuous movement 410-1 of the touch within the speech bubble 191b11 through the touch screen 190 and the touch screen controller 195. The controller 110 may detect the location of the continuous movement of the touch (for example, a plurality of X coordinates and Y coordinates 410a, 410b, and coordinates between 410a and 410b) within the speech bubble 191b11 on the basis of the electrical signal received from the touch screen controller 195.

The continuous movement of the touch (for example, movement 410-1 from the initial location 410a to the final location 410b) within the speech bubble 191b11 may be a touch gesture input into the touch screen 190. The continuous movement of the touch (for example, movement 410-1 in the direction of a boundary (or a boundary line) between the speech bubble and the display area from the initial location 410a) within the speech bubble 191b11 may be a touch gesture input into the touch screen 190.

According to an embodiment of the disclosure, the continuous movement 410-1 of the touch may include at least one of a swipe, drag, flick, or rotation from the initial location 410a. Further, the continuous movement 410-1 of the touch may include continuous movement of a multi-touch from the initial location 410a and another location (not shown), as well as continuous movement of a single touch.

Referring to FIGS. 4B to 4D, all text and some text within the speech bubble 191b11 may be selected in response to the continuous movement 410-1 of the touch. Selection of text that is a target to be recognized (or text to be recognized) may be displayed (or started) from the initial touch location 410a in response to the continuous movement 410-1 of the touch.

Text that is a target to be recognized (or text to be recognized) may be selected from the initial touch location 410a in response to the continuous movement 410-1 of the touch. The start location of text that is the target to be recognized (or text to be recognized) at the initial touch location 410a may be distinguished from text (for example, font, color change, font size change, or addition of font highlight color) that is not to be recognized (or that is not selected) in response to the continuous movement 410-1 of the touch. The text that is a target to be recognized (or text to be recognized) may be distinguished from text (for example, font, color change, font size change, or addition of font highlight color) that is not to be recognized (or that is not selected), selected from the cursor displayed at the initial touch location 410a in response to the continuous movement 410-1 of the touch.

The text that is a target to be recognized (or text to be recognized) at the initial touch location 410a may include a consonant, a vowel, a phoneme including a consonant and a vowel, or a word located that the initial touch location 410a.

The initial touch location 410a may be "Seo" in "Seoul Metropolitan City". The text selected in accordance with the initial touch location 410a may be "Seo". The text selected by the continuous movement 410-1 of the touch starting at the initial touch location 410a may be "Seoul Metropolitan City". When the initial touch location 410a is detected at any position in "Seoul Metropolitan City" within the speech bubble 191b11, the text selected by the continuous movement 410-1 of the touch starting at the initial touch location 410a may be "Seoul Metropolitan City".

The text 410s selected in response to continuous movement 410-1 of the touch from the initial touch location 410a to the final touch location 410b may be "Seoul Metropolitan City Gangnam-gu Yeoksam-1 dong 736-32". The text 410s selected in response to continuous movement 410-1 of the touch from the initial touch location 410a to the final touch location 410b may extend to "Seoul Metropolitan City Gangnam-gu Yeoksam-1 dong 736-32". Further, the text selected in response to the continuous movement 410-1 of the touch from the initial touch location 410a to the final touch location 410b may extend to "Seoul Metropolitan City Gangnam-gu" and "Yeoksam-1 dong 736-32" in the next line. The finally selected text 410s according to the continuous movement 410-1 of the touch may be "Seoul Metropolitan City Gangnam-gu Yeoksam-1 dong 736-32".

Further, the text selected in response to continuous movement 410-1 of the touch from the initial touch location 410a to the final touch location 410b may be all text input and displayed within the speech bubble 191b11 (for example, "the address is Seoul Metropolitan City Gangnam-gu Yeoksam-1 dong 736-32"). The user may perform a touch such that the initial touch location is placed within the speech bubble 191b11 in order to select the text to be recognized.

The text finally selected (for example, "the address is Seoul Metropolitan City Gangnam-gu Yeoksam-1 dong 736-32") according to the continuous movement 410-1 of the touch may be stored (or temporarily stored) in the storage unit 175 under the control of the controller 110.

The user may release (touch off) the touch (contact with the speech bubble 191b11 or the touch screen 190) at the final location 410b of the continuous movement 410-1 of the touch. The direction of continuous movement 410-1 of the touch may be one of up, down, left, and right directions.

Figure 5C:
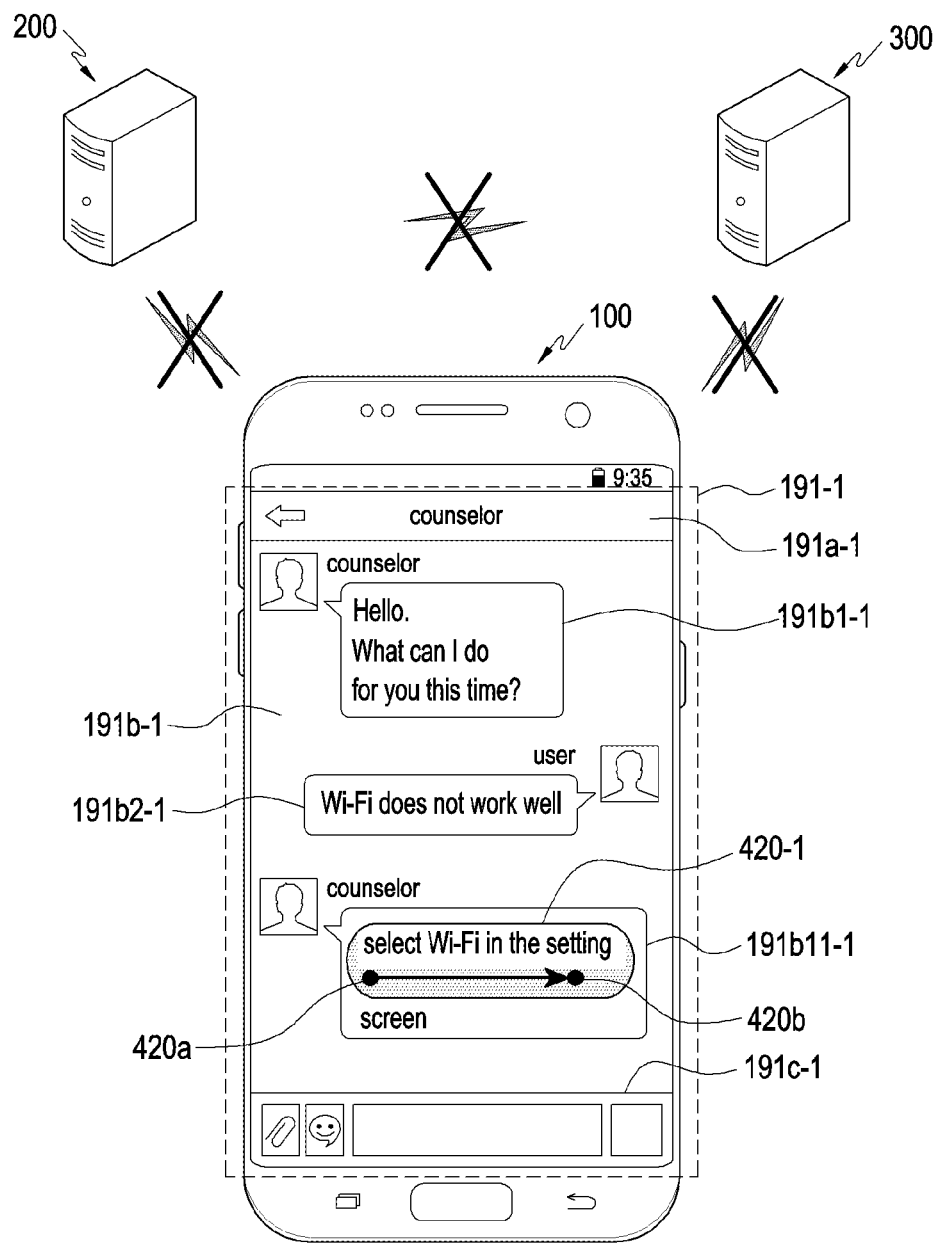
Figure 5D:
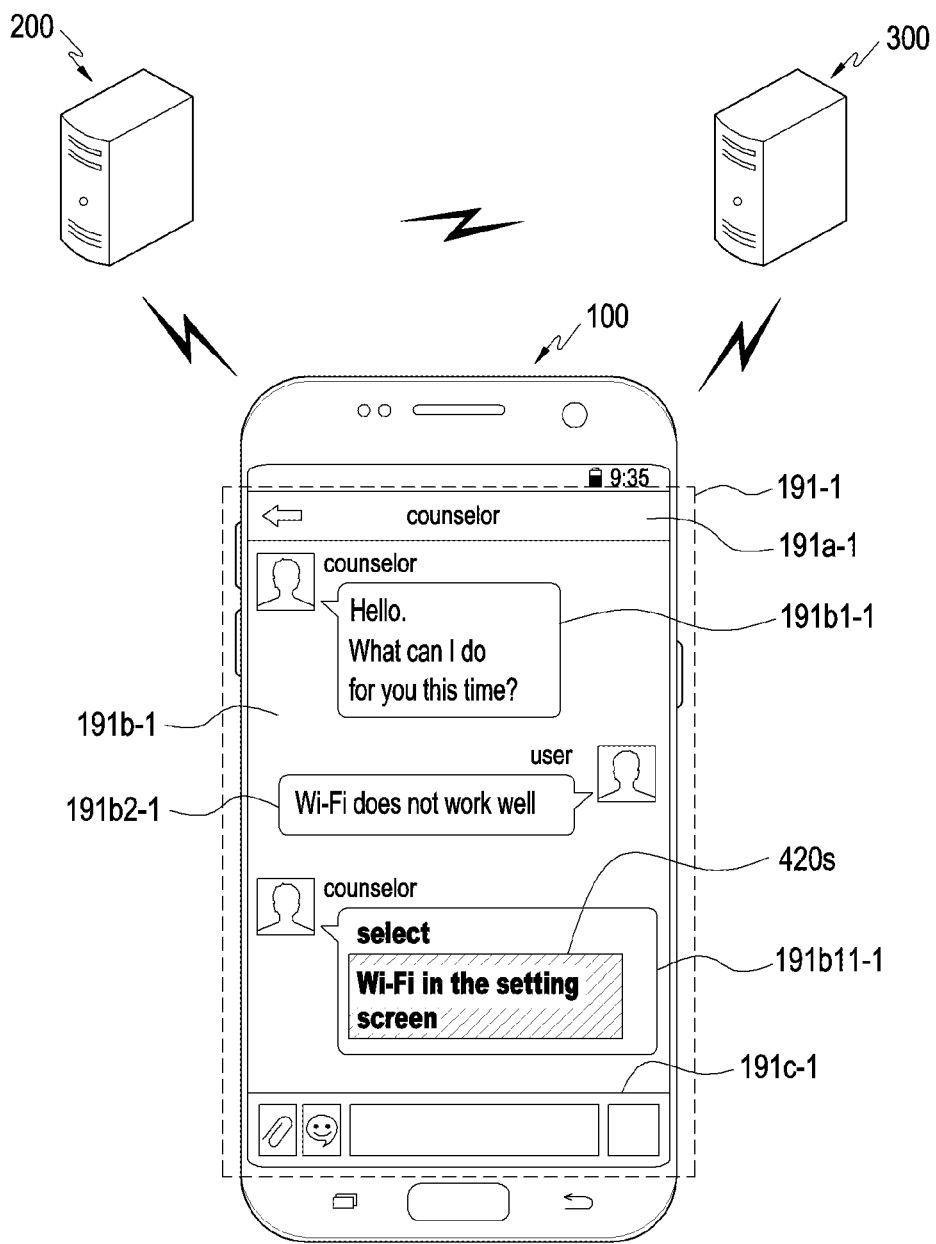

Referring to FIGS. 5C and 5D, which are another embodiment of the disclosure, continuous movement of a detected touch is received.

The user inputs a plurality of X coordinates and Y coordinates 420-1 corresponding to continuous movement of the touch (for example, continuous touch 420a to 420b) in the speech bubble 191b11-1. The user may maintain the touch 420 at the initial touch location 420a for a preset time (for example, 500 ms or shorter, but changeable). After maintaining the touch 420 at the initial touch location 420a, the user may input continuous movement of the touch (for example, the plurality of X coordinates and Y coordinates 420-1 corresponding to the continuous touch 420a to 420b).

Referring to FIGS. 5B to 5D, text may be selected from the initial touch location 420a in response to the continuous movement 420-1 of the touch.

The initial touch location 420a may be "select" in "select Wi-Fi in the setting screen". Text selected in response to the continuous movement 420-1 of the touch from the initial touch location 420a to the final touch location 420b may extend to "Wi-Fi in the setting screen".

The user may release (touch off) the touch (contact with the speech bubble 191b11-1 or the touch screen 190) at the final location 420b of the continuous movement 420-1 of the touch.

Since the selection of text to be recognized (corresponding to FIGS. 5B and 5D) in response to the continuous movement 420-1 of the touch in step S330 of FIG. 3 is substantially similar to the selection of text to be recognized (corresponding to FIGS. 4B and 4D) in response to the continuous movement 410-1 of the touch in step S330 of FIG. 3, an overlapping description is omitted.

In step S340 of FIG. 3, the selected text may be recognized.

Referring to FIG. 4D, the controller 110 may transmit (or convert and transmit) a signal corresponding to the stored text according to a wireless communication standard so as to be received by the text recognition server 200. The controller 110 may control the communication unit 130 to transmit a packet including a signal corresponding to the stored text to be recognized. The packet may be a packet complying with a wireless communication standard or a short-range communication standard.

The controller (not shown) of the text recognition server 200 performs text recognition on the received packet through a text recognition algorithm. The text recognition algorithm may split text included in the packet in units of phonemes, words, or sentences, compare the same with a reference pattern (or a standard pattern), and recognize a phoneme (word or sentence). The text recognition algorithm may include pattern matching, structure analysis, feature matching, or stroke analysis. The text recognition algorithm may be selectively or separately used for the use (or purpose).

A storage unit (not shown) of the text recognition server 200 may store (update) a phoneme database corresponding to a specific phoneme (specific word or specific sentence). The controller of the text recognition server 200 may generate text data (corresponding to selected text) using the recognized phoneme and the pre-stored database. The controller of the text recognition server 200 may generate text recognition data in the form of a word or a sentence.

The controller of the text recognition server 200 may store the generated text data in the storage unit. The controller of the text recognition server 200 may transmit text data to the portable device 100 through a communication unit (not shown) in preference to control information (described below). The controller of the text recognition server 200 may transmit text data to the control information server 300 through a communication unit (not shown).

The controller of the control information server 300 may convert control information (for example, a control instruction) using text data. The text data may be received from the text recognition server 200 or the integrated portable device 100-1. The control information may control a screen (operation or function) of the portable device 100. Further, the control information may control a screen (operation or function) of the text recognition server 200.

The control information server 300 may include a control information database. The control information server 300 may store the control information database in the storage unit.

The controller of the control information server 300 may determine (select, convert, or generate) control information corresponding to the recognized text data on the basis of the stored control information database. The control information server 300 may determine (select, convert, or generate) control information (which, for example, can be parsed by the portable device 100) for controlling the portable device 100 on the basis of the text data and the control information database. For example, if continuous movement of a touch is received in text within the speech bubble 191*d*11, the portable device 100 may transmit an electrical signal (for example, a digital signal, an analog signal, or a packet) corresponding to the selected text to the text recognition server 100 through the communication unit. The text recognition server 200 may convert the received electrical signal (or packet) into text data (for example, "Seoul Metropolitan City Gangnam-gu Yeoksam-1 dong 736-32"). The text recognition server 200 may determine (select, covert, or generate) control information using the text data.

The control information may display a location corresponding to the text data (for example, "Seoul Metropolitan City Gangnam-gu Yeoksam-1 dong 736-32") on a screen of a map application being executed (or which has been executed). The control information may display a shop (company) name corresponding to the text data (for example, "Seoul Metropolitan City Gangnam-gu Yeoksam-1 dong 736-32") on a screen of a web browser being executed (or which has been executed. The application corresponding to the control information is not limited thereto, and various (linked) applications may be executed according to settings.

The controller of the control information server 300 may transmit control information to the portable device 100 through the communication unit.

When text recognition is performed by the text recognition server 200, text (for example, "text is being recognized"), an image (corresponding to "text is being recognized"), a video including a symbol and a flash (corresponding to "text is being recognized") corresponding to text recognition being performed by the text recognition server 200 may be displayed on the screen of the portable device 100.

When control information is determined (selected, converted, or generated) by the control information server 300, text (for example, "control information is being determined"), an image (corresponding to "control information is being determined"), a video including a symbol and a flash (corresponding to "control information is being determined") corresponding to determination of the control information performed by the control information server 300 may be displayed on the screen of the portable device 100.

[Table 1] below may be an example of control information.

TABLE 1

| No. | Text to be recognized | Text recognition type | Determined application name |
|---|---|---|---|
| 1 | 787-8 XX-gu, OO-si Near YY station Front gate of ZZ university | Address | Map application |
| 2 | AA restaurant (BB-dong) | Shop name | Map application |
| 3 | Passport photo | Photo | Photo application |
| 4 | Environment setting Wi-Fi | Screen | Environment-setting screen |
| ... | ... | ... | ... |

Referring to [Table 1], the text to be recognized may be text, to be recognized, which is selected by continuous movement of the touch. The text recognition type may be determined according to the result of text recognition of the selected text to be recognized. An application (or an application name, an application type, or a stored application path) executed (or currently being executed) by the portable device 100 may be determined by the text recognition type. Each of the items shown in [Table 1] (for example, the text to be recognized, the text recognition type, and the determined application) may have a bitstream (not shown) or a size (for example, bits or bytes). Control information corresponding to [Table 1] may be stored after being converted by the portable device 100 or the integrated portable device 100-1 as well as the control information server 300.

The items shown in [Table 1] (for example, the text to be recognized, the text recognition type, and the determined application) are not limiting, and may be added, deleted, or changed.

Referring to [Table 1], the text to be recognized may be text, to be recognized, which is selected by continuous movement of the touch. The text recognition type may be determined according to the result of text recognition of the selected text to be recognized. The accuracy of the recognition result of the text to be recognized may be continuously improved through Artificial Intelligence (AI) technology (for example, including deep learning).

Through unsupervised learning of text data provided in various forms, a pattern between unlabeled data may be detected. Elements of data are grouped on the basis of similarity between the data. The content of the text may be inferred from the learned data to suit the context and the user's intention, and the type of the corresponding text may be classified even though the result does not perfectly match the form of text to be recognized, which is the example shown in [Table 1].

The application (or an application name, an application type, or a stored application path) executed (or currently being executed) by the portable device 100 may be determined by the text recognition type.

The portable device 100 and the text recognition server 200 may be implemented as the integrated portable device 100-1. Since the operation of the integrated portable device 100-1 is substantially similar to the operation of the portable device 100 and the operation of the text recognition server 200, which are separate from each other, an overlapping description will be omitted. The text recognition server 200 and the control information server 300 may be implemented as an integrated text recognition server 200-1. Since the operation of the integrated text recognition server 200-1 is substantially similar to the operation of the text recognition server 200 and the operation of the control information server 300, which are separate from each other, an overlapping description may be omitted.

Referring to FIG. 5, which shows another embodiment of the disclosure, selected text is recognized. The controller 110 may transmit (convert and transmit) a signal corresponding to stored text according to a wireless communication standard so as to be received by the text recognition server 200.

The control information server 300 or the text recognition server (or the integrated text recognition server) may transmit control information corresponding to the text recognition result to the portable device 100.

Since the text recognition (corresponding to FIG. 5D) of the selected text in step S340 of FIG. 3 is substantially similar to the text recognition (corresponding to FIG. 4D) of the selected text in step S340 of FIG. 3, an overlapping description is omitted.

In step S350 of FIG. 3, the current screen is changed according to the text recognition result.

Figure 4E:
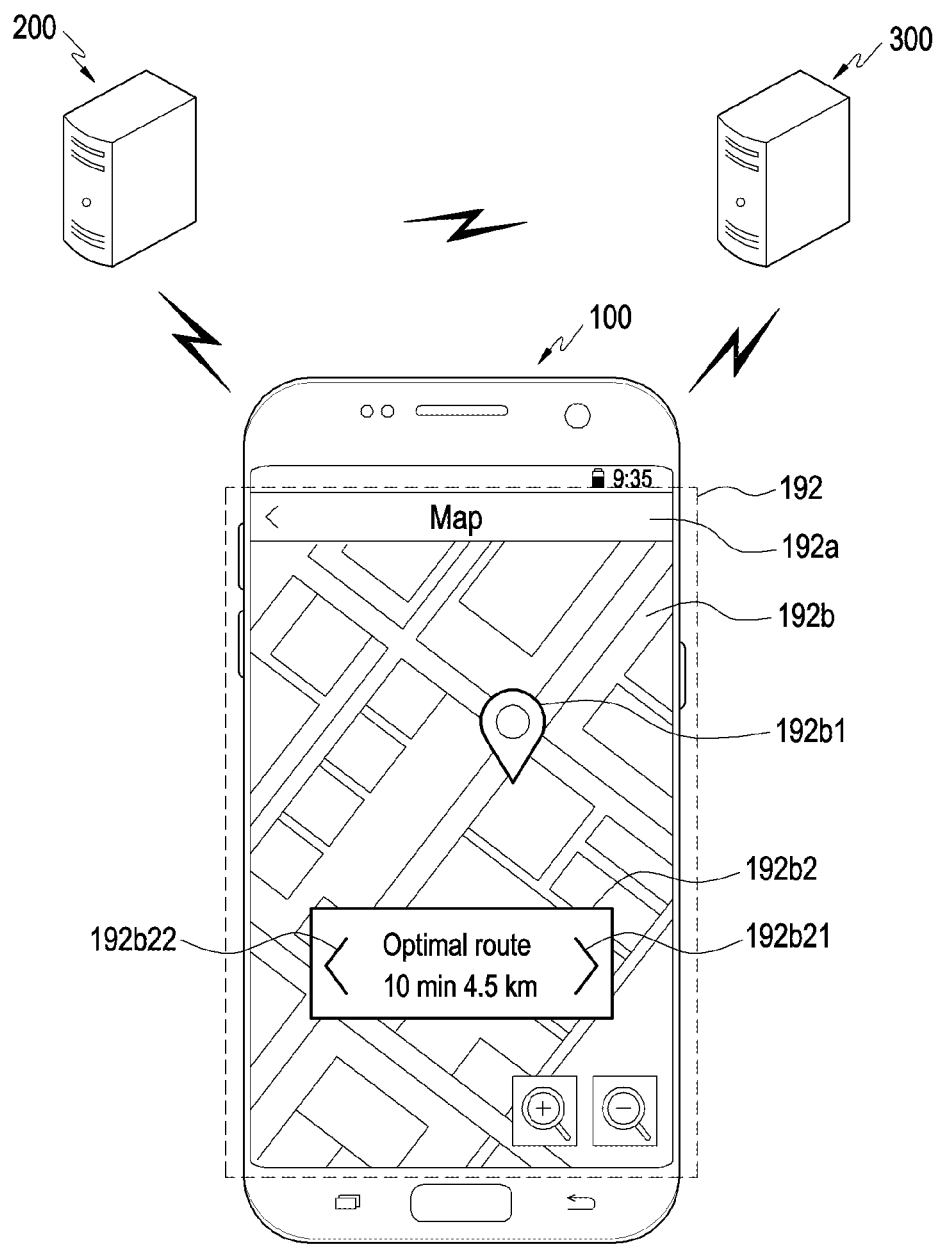

Referring to FIG. 4E, the controller 110 of the portable device 100 may receive control information through the communication unit. The controller 110 of the portable device 100 may receive control information from the control information server 300 through the communication unit. Further, the controller 110 of the portable device 100 may receive control information from the integrated text recognition server 200-1 through the communication unit.

The controller 110 of the portable device 100 may receive text data ("Seoul Metropolitan City Gangnam-gu Yeoksam-1 Dong 736-32") through the communication unit. Further, the controller 110 of the portable device 100 may receive text data from the integrated text recognition server 200-1 through the communication unit. The portable device 100 may receive the text data and the control data together or separately.

The controller 110 may parse the received control information. The controller 110 may change the current screen 191 through parsing of the control information. The controller 110 may change the current screen 191 (for example, the chatting application screen) to another screen (for example, the map application screen 192) through parsing of the control information.

The change in the current screen may include a change in an executed application (for example, from a first screen in the displayed map application (a location of first text (for example, a setting screen (see FIG. 5E)) recognized in response to continuous movement of the touch) to a second screen (a location of second text (Wi-Fi (see FIG. 5F)) recognized in response to continuous movement of the touch)) as well as the display of the changed application screen.

Further, the change in the current screen may include a change from the first screen 191 of the same application (for example, the map application) to another screen (for example, a chatting history (not shown) of another counterpart (for example, assistant manager Kim (not shown))).

The controller 110 may determine the map application scheduled to be executed (for example, display the map application in the title area 192a of the application) through parsing of the control information. The controller 110 may determine a place 192b1 for a get-together according to the text recognition result in the map display area 192b of the map application screen 192 through parsing of the control information.

The controller 110 may display the minimum time required (for example, 10 minutes) to travel between the current location of the user (for example, an office) and the location 191b1 for the get-together and the minimum distance (for example, 4.5 km) on the map application screen 192 in the form of a popup 192b2 through parsing of the control information. The shortest distance or the shortest time required may be displayed according to the selection of direction keys 192b21 and 192b22 within the popup 192b.

The controller 110 may provide the user with feedback corresponding to a screen change according to continuous movement of the touch received in text within the speech bubble. The controller 110 may provide the user with feedback corresponding to a screen change according to the result of recognition of the text selected by continuous movement of the touch received in text within the speech bubble.

The controller 110 may provide one of visual feedback, auditory feedback, and tactile feedback. Further, the controller 110 may provide the user with a combination of visual feedback, auditory feedback, and tactile feedback.

The visual feedback may include a visual effect (for example, a separate image or an animation effect such as fading applied to the separate image) (not shown) corresponding to the screen change according to continuous movement of the touch received in text within the speech bubble. The controller 110 may display the visual feedback on the touch screen 190.

The auditory feedback may include a sound corresponding to the screen change according to continuous movement of the touch received in text within the speech bubble. The controller 110 may output the auditory feedback through the speaker 163. The controller 110 may output the auditory feedback through one or a plurality of speakers.

The tactile feedback may include vibration corresponding to the screen change according to continuous movement of the touch received in text within the speech bubble. The controller 110 may output the tactile feedback through the vibration motor 164. When the number of vibration motors 164 is plural, the controller 110 may output the tactile feedback selectively through one of the plurality of vibration motors.

A feedback provision time (for example, 500 ms) provided to the user may be changed through environment settings (not shown). Further, at least one of a plurality of kinds of feedback (for example, visual feedback, auditory feedback, and tactile feedback) provided in response to the screen change according to continuous movement of the touch received in text within the speech bubble may be selected.

Figure 5E:
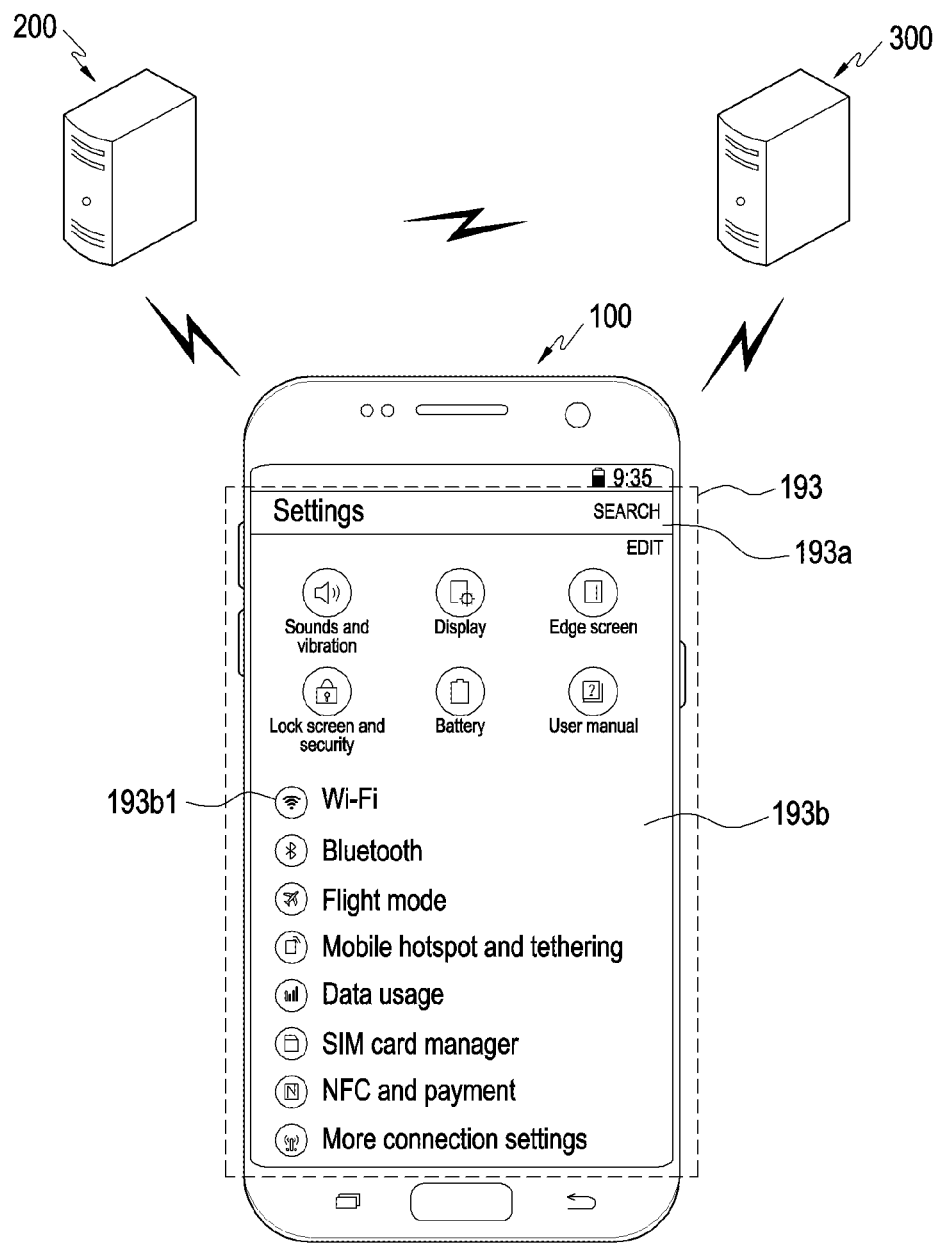
Figure 5F:
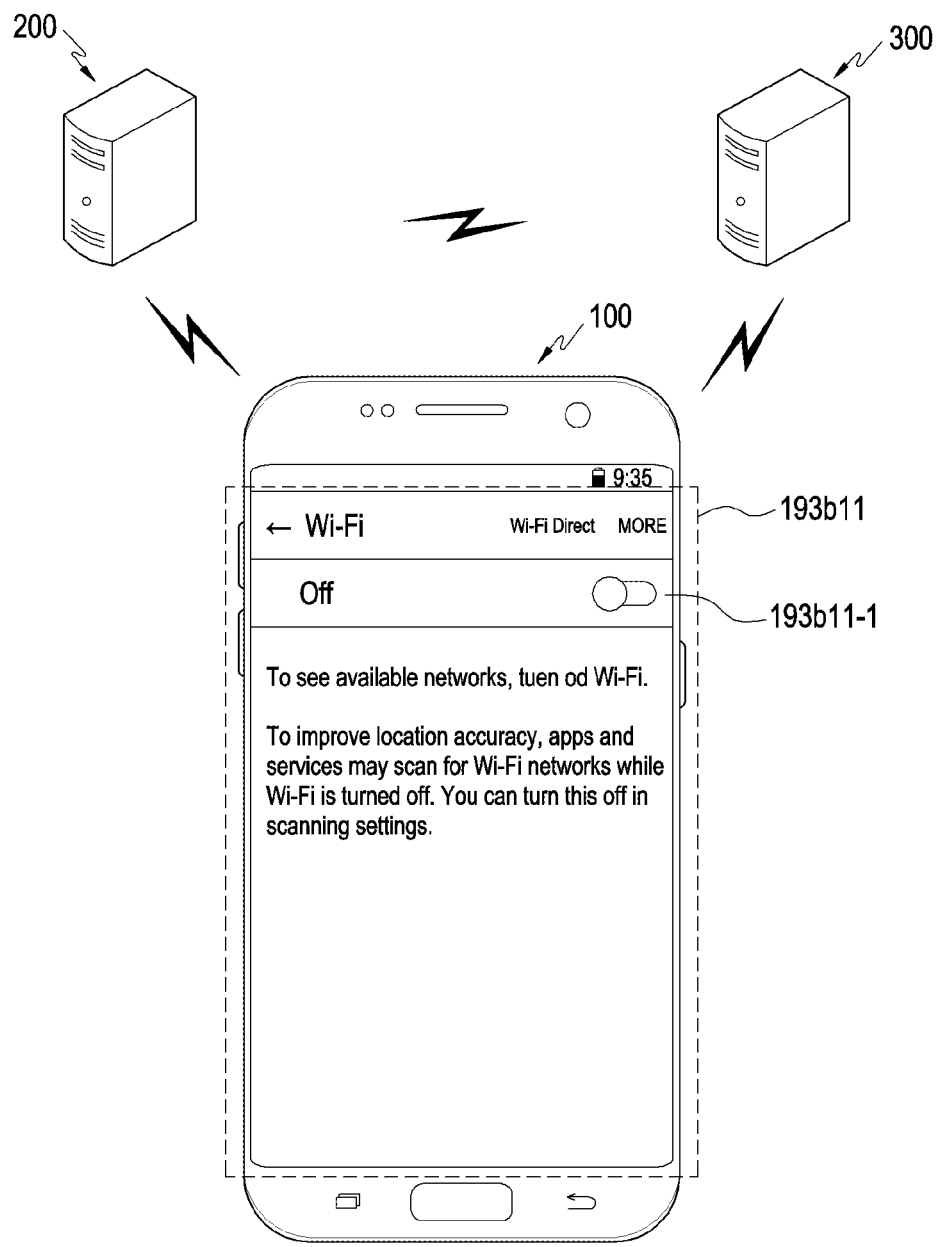

Referring to FIGS. 5E and 5F, which show another embodiment of the disclosure, the controller 110 of the portable device 100 may receive control information through the communication unit. The controller 110 of the portable device 100 may receive control information from the control information server 300 or the integrated text recognition server 200-1 through the communication unit. The controller 110 of the portable device 100 may receive text data ("Wi-Fi in the setting screen") from the text recognition server 200 (or the integrated text recognition server) through the communication unit. The portable device 100 may receive the text data and the control data together or separately.

The controller 110 may parse the received control information. The controller 110 may change the current screen 191-1 through parsing of the control information. The controller 110 may change the current screen 191-1 (for example, the chatting application screen) to another screen 193 (for example, environment settings) through parsing of the control information. The change in the current screen may include a change in an executed application as well as the display of the changed application screen.

The controller 110 may determine an environment-setting screen scheduled to be executed (display environment settings in the title area 193a of the screen) through parsing of the control information. The controller 110 may display the environment-setting screen 193 including settings such as Wi-Fi 193b1 in the setting display area 193b through parsing of the control information. A Wi-Fi screen 193b11 may be displayed sequentially or continuously next to the display of the environment-setting screen 193. The controller 110 may directly display the Wi-Fi screen 193b11 through parsing of the control information. The user may turn on Wi-Fi, which is turned off, through a Wi-Fi on/off switch 193b11-1 within the Wi-Fi screen 193b11.

According to another embodiment of the disclosure, settings included in the displayed environment-setting screen 193 may display each screen (for example, sound and vibration, a display, an edge screen, a lock screen and security, a battery, a user manual, Bluetooth, airplane mode, mobile hotspot, and data use) according to the result of recognition of the selected text within the speech bubble. Screens of the remaining settings, which are not displayed on the environment-setting screen 193, may be displayed according to the result of recognition of the selected text within the speech bubble. Further, in addition to the environment-setting screen 193, screens of settings included in a quick panel (not shown) may be displayed according to the result of recognition of the selected text within the speech bubble.

According to another embodiment of the disclosure, not only the screen change but also a change in a function (or setting) of the portable device 100 may be directly made. For example, the controller 110 may directly change from a ringtone mode of the portable device 100 to a vibration mode in response to the received control information according to the result of recognition of the selected text (for example, "change the mode of the mobile device to the vibration mode during the meeting") within the speech bubble. The controller 110 may change the screen brightness of the portable device 100 to be brighter in response to the received control information according to the result of recognition of the selected text (for example, "brighten the screen more in a dark place") within the speech bubble.

Further, the controller 110 may directly change a battery mode of the portable device 100 to a battery-saving mode in response to the received control information according to the result of recognition of the selected text (for example, "lack of battery power") within the speech bubble. The change in the function (or setting) of the portable device 100 is not limited thereto, and may be applied to any function (or setting) supportable by the portable device.

According to another embodiment of the disclosure, an application executed according to control information corresponding to text recognition of selected text within the speech bubble may include external device control information (for example, home appliances (or electronic devices) within the home, an office electronic device in an office, or the Internet of Things (IoT)) device installed in the portable device 100. The home appliances (or electronic devices) within the home are home appliances (or electronic devices) linked to a home network and may include a refrigerator, a washing machine, a robot cleaner, an air conditioner, a display device including a TV, an audio device including a speaker, a door lock device, a security device including CCTV, a gas circuit breaker, a power breaker, or sensor devices such as a gas detection sensor, a fire alarm, and a security sensor. The office electronic device may include a printer, a copy machine, a speaker, or a fax linked to a corporate network (including an intranet). The IoT device may include a lamp, various sensors installed within the home, and a door lock device. The IoT device may be included in home appliances.

Figure 6A:
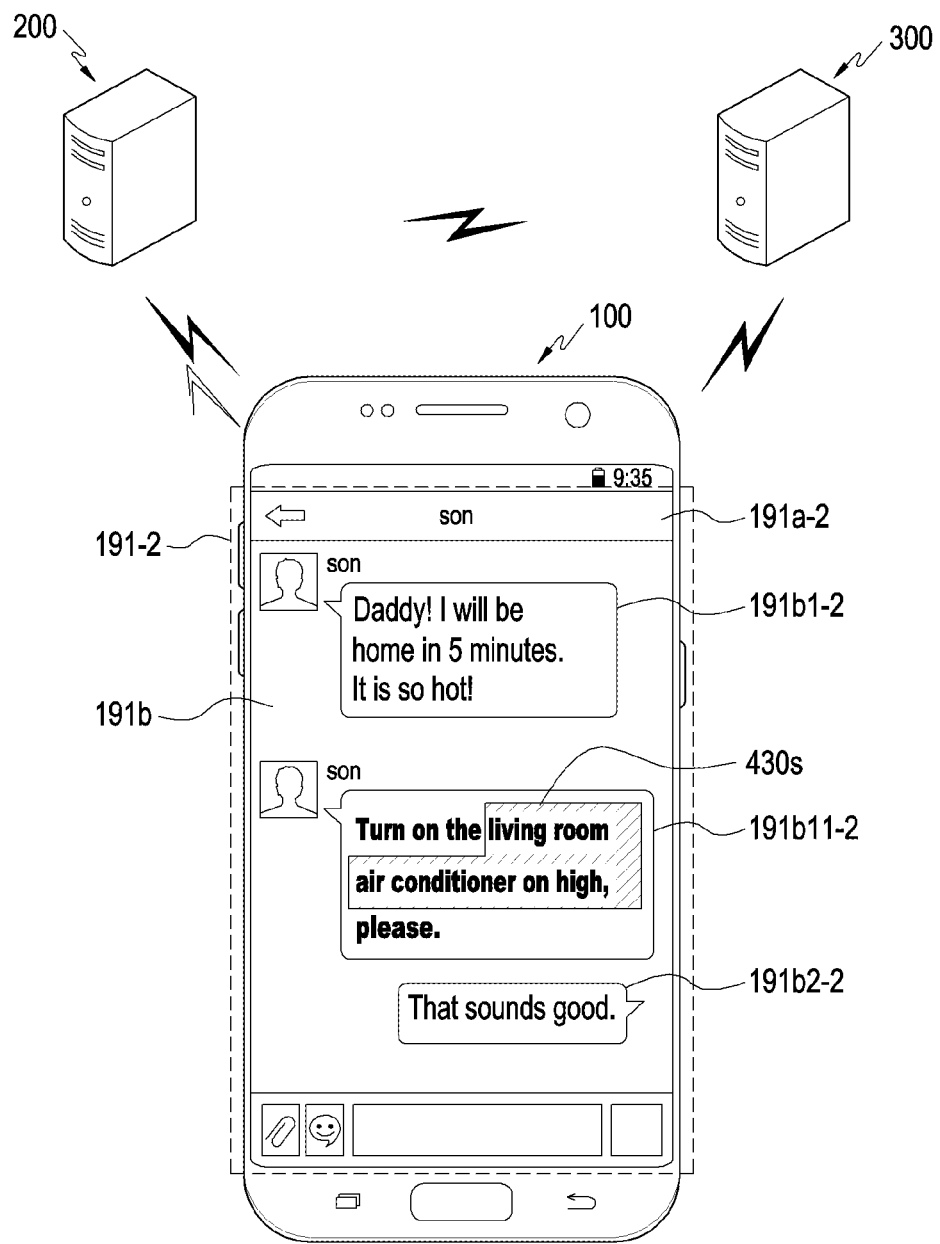
FIGS. 6A and 6B illustrate an example of the method of controlling the screen by the portable device according to another embodiment of the disclosure.
Figure 6B:
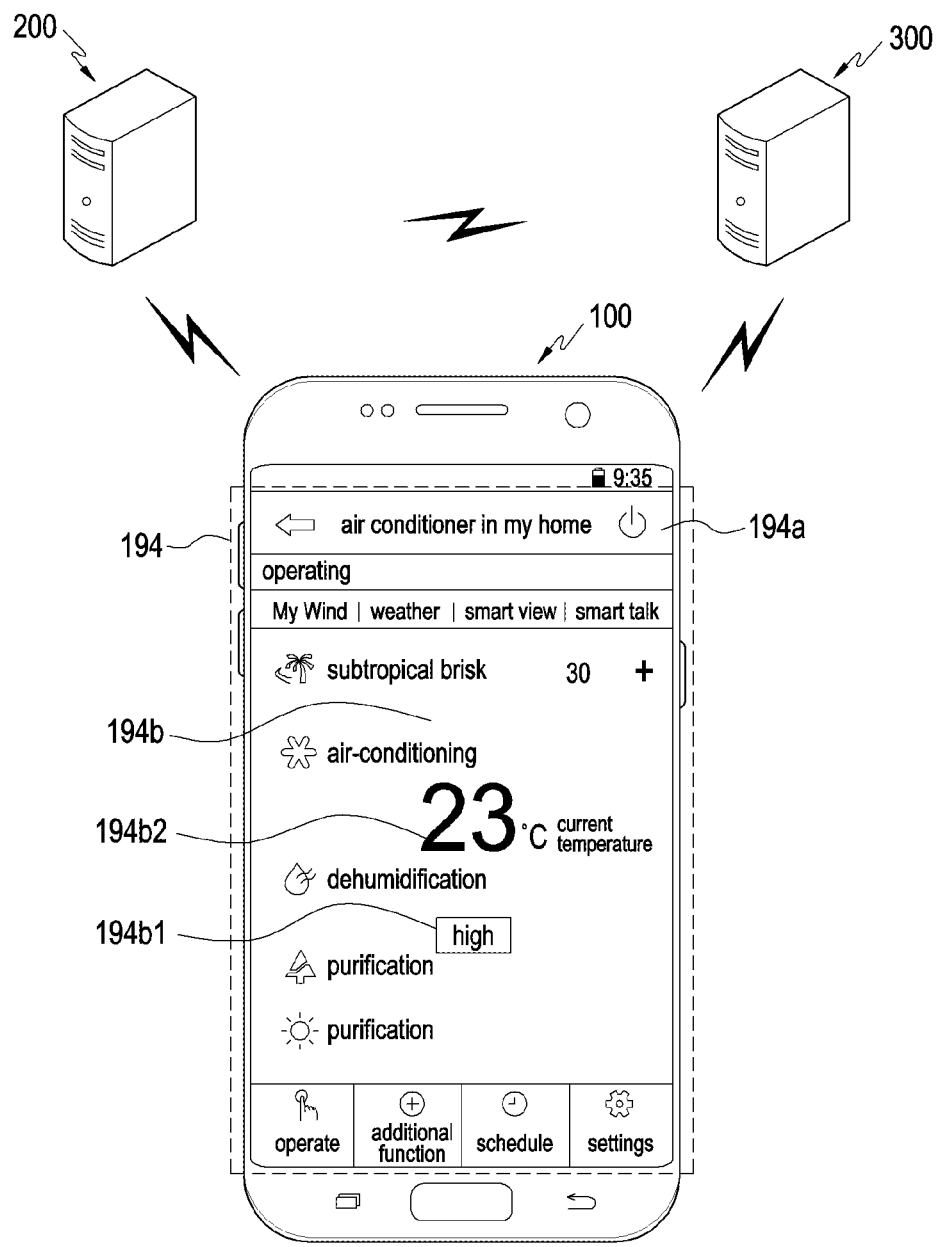

FIGS. 6A and 6B illustrate an example of the method of controlling the screen by the portable device according to another embodiment of the disclosure.

Referring to FIGS. 6A and 6B, chatting is performed in the chatting application 191 displayed on the screen of the portable device. Speech bubbles 191b-2 to 191b2-2 exchanged between a user and a counterpart (one of a sender and a receiver) may be displayed in the display area 191b-2.

The user inputs a touch (including hovering) (not shown) into a speech bubble 191b11-2. Since the touch and/or continuous movement of the touch input into a speech bubble 191b11-2 is substantially similar to the touch and/or continuous movement of the touch input in steps S320 and S330 of FIG. 3 (differing, for example, only with respect to the touch and the touch gesture), an overlapping description is omitted.

Text 430s selected in response to continuous movement of the touch from the initial touch location to the final touch location may be "the air conditioner on high". Since the text 430s selected in response to continuous movement of the touch is substantially similar to the text 410s selected in response to continuous movement of the touch in FIG. 4D (for example, only difference in selected text), an overlapping description is omitted.

Since the text recognition of the text 430s selected in response to continuous movement of the touch is substantially similar to text recognition of the text selected in step S340 of FIG. 3, an overlapping description is omitted.

Referring to FIG. 6B, the controller 110 of the portable device 100 may receive control information through the communication unit. The controller 110 may parse the received control information. The controller 110 may change the current screen 191-2 through parsing of the control information. The controller 110 may change (or execute) the current screen 191-2 (for example, the chatting application screen) to another screen 194 (for example, an air conditioner control application) through parsing of the control information.

The controller 110 may display (or execute) an air conditioner control application screen 194 displayed in a title area 194*a* as the home air conditioner through parsing of the control information. The controller 110 may display an operation mode 194*b*1 (for example, strong wind) and a current temperature 194*b*2 (for example, 23° C.) in an air conditioner application display area 194*b* of the air conditioner control application screen 194 through parsing of the control information. Further, the user may select the operation mode (for example, strong wind) in the air conditioner application display area 194*b* of the air conditioner control application screen 194.

The controller 110 may provide the user with feedback corresponding to a screen change (from the screen 191 to the screen 193 or 194) according to continuous movement of the touch received in text within the speech bubble. The controller 110 may provide the user with feedback corresponding to a screen change (from the screen 191 to the screen 193 or 194) according to the result of recognition of the text selected by continuous movement of the touch received in text within the speech bubble.

In step S350 of FIG. 3, when the current screen is changed according to the text recognition result, the method of controlling the screen by the portable device is terminated.

The methods according to the exemplary embodiments of the disclosure may be in a form of program commands executed through various computer means to be recorded in a computer readable medium. The computer readable medium may include a program command, a data file, a data structure, and the like independently or in combination. The computer readable medium may be stored, for example, in a volatile or non-volatile storage device such as a ROM, a memory such as a RAM, a memory chip, a memory device, or a memory IC, or a storage medium that is optically or magnetically recordable and simultaneously machine (for example, a computer)-readable, such as a CD, a DVD, a magnetic disk, or a magnetic tape, regardless of its ability to be erased or re-recorded. A computer-readable program may be stored in a computer-readable storage medium of a server, and the computer program may be downloaded to a computing device through a network.

It is appreciated that the storage unit included in the portable device is one example of the machine-readable storage media suitable for storing a program or programs including commands for implementing various embodiments of the disclosure. The program command recorded in the medium may be things specially designed and configured for the disclosure, or things that are well known to and can be used by those skilled in the computer software related art.

Although the disclosure has been described by the restricted embodiments and the drawings as described above, the disclosure is not limited to the aforementioned embodiments, and various modifications and alterations can be made from the descriptions by those skilled in the art to which the disclosure pertains.

Accordingly, the scope of the disclosure should not be determined by the above-described embodiments, and should be determined by not only the following claims but also their equivalents.

REFERENCE NUMERALS

100: portable device 110: controller
190: touch screen 191: application screen
191*a*: title area 191*b*: display area
191*b*1: speech bubble 191*c*: input area
410: touch 410-1: continuous movement of touch

The invention claimed is:

1. A method of controlling a screen of a portable device, the method comprising:
   displaying, on the portable device, an application screen of a message application being executed in the portable device, wherein the application screen comprises a plurality of text display areas;
   detecting a touch on a text display area of the plurality of text display areas in the application screen displayed on the portable device;
   detecting a continuous movement of the touch on the text display area;
   performing, by using artificial intelligence, character recognition of a text in an area where the continuous movement of the touch is detected in the text display area,
   wherein the performing the character recognition further comprises:
   recognizing, from the text subjected to the character recognition, a setting of the portable device that is to be changed among a plurality of settings and a setting screen to be displayed, wherein the plurality of settings comprise a call notification setting, a screen brightness setting, and a battery mode setting; and
   in response to the recognizing from the text the setting of the portable device that is to be changed and the setting screen to be displayed:
   starting an execution of an application corresponding to the setting screen, which was recognized from the text, instead of the executing the message application, and displaying the setting screen of the executed application as a replacement of the application screen of the message application, the setting screen including the recognized setting,
   in response to the displaying the setting screen recognized from the text, providing a feedback comprising at least one from among an auditory feedback and a tactile feedback that are recognized by a user as corresponding to a change from the displaying the application screen of the message application to the displaying the setting screen,
   receiving, in the setting screen, a user input for changing the state of the recognized setting of the portable device, and
   changing the state of the recognized setting to a state selected by the user input,
   wherein the changing the state of the setting further comprises one from among changing from a ringing mode to a vibration mode, changing a screen brightness, and changing to a battery-saving mode, and
   wherein the setting screen is one of a plurality of setting screens through which corresponding settings for an environment-setting of the portable device are changeable.

2. The method of claim 1, wherein the plurality of text display areas comprises at least one text display area of a user corresponding to at least one transmitted text message, and at least one text display area of a counterpart corresponding to at least one received text message.

3. The method of claim 1, wherein the continuous movement of the touch comprises at least one of a single-touch gesture, a multi-touch gesture, a flick, a swipe, a drag, or a rotation.

4. The method of claim 1, wherein the text is recognized by one of the portable device or a text recognition server connected to the portable device through communication.

5. The method of claim 1, wherein the changing the state of the setting further comprises changing the state of the setting based on control information received from a server connected to the portable device.

6. The method of claim 1, wherein the text selected by the continuous movement of the touch is displayed distinguishably from other text displayed in the text display area.

7. The method of claim 1, wherein the feedback comprises at least one from among the auditory feedback, the tactile feedback, and the visual feedback.

8. The method of claim 1, wherein the feedback comprises a combination of the auditory feedback, the tactile feedback, and the visual feedback.

9. The method of claim 1, wherein the recognizing further comprises recognizing, from the text subjected to the character recognition, an action to be performed that is related to a change of a state of the setting, and
wherein the method further comprises automatically changing the state of the setting of the portable device to a state corresponding to the action recognized from the text, without displaying the setting screen and without a user intervention.

10. A method of controlling a screen of a portable device, the method comprising:
displaying, on the portable device, an application screen of a message application being executed in the portable device, wherein the application screen comprises a plurality of text display areas;
detecting a touch on a text display area in one of the plurality of text display areas in the application screen displayed on the portable device;
displaying a cursor in a text in the text display area based on the touch;
detecting a continuous movement of the touch on the text display area;
performing, by using artificial intelligence, character recognition of some of the text selected from the cursor based on the continuous movement of the touch, wherein the performing the character recognition further comprises:
recognizing, from the some of the text subjected to the character recognition, a setting of the portable device that is to be changed among a plurality of settings and a setting screen to be displayed, wherein the plurality of settings comprise a call notification setting, a screen brightness setting, and a battery mode setting; and
in response to the recognizing, from the some text, the setting of the portable device that is to be changed and the setting screen to be displayed:
starting an execution of an application corresponding to the setting screen, which was recognized from the some text, instead of the executing the message application, and displaying the setting screen of the executed application as a replacement of the application screen of the message application, the setting screen including the recognized setting,
in response to the displaying the setting screen, providing a feedback corresponding to the displaying the setting screen,
receiving, in the setting screen, a user input for changing the state of the recognized setting of the portable device, and
changing the state of the recognized setting to a state selected by the user input,
wherein the changing the state of the setting of the portable device further comprises one from among changing from a ringing mode to a vibration mode, changing a screen brightness, and changing to a battery-saving mode, and
wherein the setting screen is one of a plurality of setting screens through which corresponding settings for an environment-setting of the portable device are changeable.

11. The method of claim 10, wherein the some of the text is displayed distinguishably from other text which is displayed in the text display area but is not selected.

12. The method of claim 10, wherein the recognizing is performed by one of the portable device or a text recognition server connected to the portable device through communication.

13. The method of claim 10, wherein the changing the state of the setting further comprises changing the state of the setting based on control information received from one of a text recognition server or a control information server connected to the portable device through communication.

14. A portable device comprising:
a communication unit connected to an external device;
a touch screen configured to display an application screen; and
a processor configured to control the communication unit and the touch screen,
wherein the processor is further configured to:
display, on the touch screen, the application screen of a message application being executed in the portable device, wherein the application screen comprises a plurality of text display areas,
perform, by using artificial intelligence, character recognition of a text in an area where a continuous movement of a touch is detected in a text display area among the plurality of text display areas,
recognize, from the text subjected to the character recognition, a setting of the portable device that is to be changed among a plurality of settings and at least one from among a setting screen to be displayed and an action to be performed that is related to a change of a state of the setting, wherein the plurality of settings comprise a call notification setting, a screen brightness setting, and a battery mode setting,
in response to the setting screen to be displayed being recognized:
start an execution of an application corresponding to the setting screen, which was recognized from the text, instead of the executing the message application, and display the setting screen of the executed application as a replacement of the application screen of the message application, the setting screen including the recognized setting,
in response to the displaying the setting screen recognized from the text, provide a feedback comprising at least one from among an auditory feedback and a tactile feedback that are recognized by a user as corresponding to a change from the displaying the application screen of the message application to the displaying the setting screen,
receive, in the setting screen, a user input for changing the state of the recognized setting of the portable device, and
change the state of the recognized setting to a state selected by the user input, and
in response to the action to be performed that is related to the change of the state of the setting being recognized, automatically change the state of the setting of the portable device to a state corresponding to the action recognized from the text, without a user intervention, wherein the recognized action comprises one from among changing from a ringing mode to a vibration mode, changing a screen brightness, and changing to a battery-saving mode, and wherein the setting screen is one of a plurality of setting screens through which corresponding settings for an environment-setting of the portable device are changeable.

15. The portable device of claim 14, wherein the processor is further configured to display the text in the text display area selected by the continuous movement of the touch distinguishably from other text displayed in the text display area.

16. The portable device of claim 14, further comprising a pressure touch pad, wherein the touch is detected through the pressure touch pad.

17. The portable device of claim 14, wherein the text is recognized by one of the portable device or a text recognition server connected to the portable device through the communication unit.

\* \* \* \* \*